(12) United States Patent
Nakanishi et al.

(10) Patent No.: US 8,803,915 B2
(45) Date of Patent: Aug. 12, 2014

(54) INFORMATION DISPLAY DEVICE, INTEGRATED CIRCUIT FOR DISPLAY CONTROL, DISPLAY CONTROL PROGRAM, AND DISPLAY CONTROL METHOD

(75) Inventors: Koji Nakanishi, Osaka (JP); Kazunori Yamada, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 140 days.

(21) Appl. No.: 13/380,174

(22) PCT Filed: Nov. 4, 2010

(86) PCT No.: PCT/JP2010/006496
§ 371 (c)(1),
(2), (4) Date: Dec. 22, 2011

(87) PCT Pub. No.: WO2011/074172
PCT Pub. Date: Jun. 23, 2011

(65) Prior Publication Data
US 2012/0120107 A1   May 17, 2012

(30) Foreign Application Priority Data
Dec. 18, 2009 (JP) ................................ 2009-287929

(51) Int. Cl.
*G09G 5/00* (2006.01)
*G03B 17/18* (2006.01)

(52) U.S. Cl.
CPC ..................... *G03B 17/18* (2013.01)
USPC ............ 345/633; 345/632; 345/636; 345/637

(58) Field of Classification Search
CPC ........ G06T 19/017; G06T 19/00; G06F 3/001
USPC ....................................................... 345/633
See application file for complete search history.

(56) References Cited

U.S. PATENT DOCUMENTS

| | | | |
|---|---|---|---|
| 4,956,873 A | * | 9/1990 | Samuels et al. ............... 382/262 |
| 2003/0003942 A1 | * | 1/2003 | Okumura ....................... 455/522 |
| 2004/0180718 A1 | | 9/2004 | Uchida et al. |
| 2008/0024523 A1 | * | 1/2008 | Tomite et al. .................. 345/632 |
| 2008/0030711 A1 | * | 2/2008 | Iizuka ........................... 356/4.03 |
| 2009/0297158 A1 | * | 12/2009 | Iizuka ........................... 398/130 |

FOREIGN PATENT DOCUMENTS

| | | |
|---|---|---|
| JP | 10-336717 | 12/1998 |
| JP | 2001-245253 | 9/2001 |
| JP | 2004-275412 | 10/2004 |
| JP | 2006-92319 | 4/2006 |
| JP | 2007-202030 | 8/2007 |
| JP | 2007-259133 | 10/2007 |
| JP | 2008-85555 | 4/2008 |
| JP | 2008-154062 | 7/2008 |
| JP | 2009-290530 | 12/2009 |

OTHER PUBLICATIONS

International Search Report issued Dec. 7, 2010 in corresponding International Application No. PCT/JP2010/006496.

* cited by examiner

*Primary Examiner* — David Zarka
*Assistant Examiner* — Tapas Mazumder
(74) *Attorney, Agent, or Firm* — Wenderoth, Lind & Ponack, L.L.P.

(57) ABSTRACT

An information display device improves readability even in cases of an unstable reception condition when information is superimposed on taken images by means of optical space transmission and displayed on the taken images. An imaging section time-sequentially takes images. An information processing section extracts, from regions whose brightness changes with time in images taken, communication information containing information for display of each region based on changes in brightness of the region. The information processing section also generates stability information representing a degree of stability of a communication state of the communication information. A display control section superimposes the extracted information for display contained in the communication information of each region on the taken images, in a mode determined in accordance with the corresponding generated stability information, and displays the information for display superimposed on the images on a display device.

15 Claims, 13 Drawing Sheets

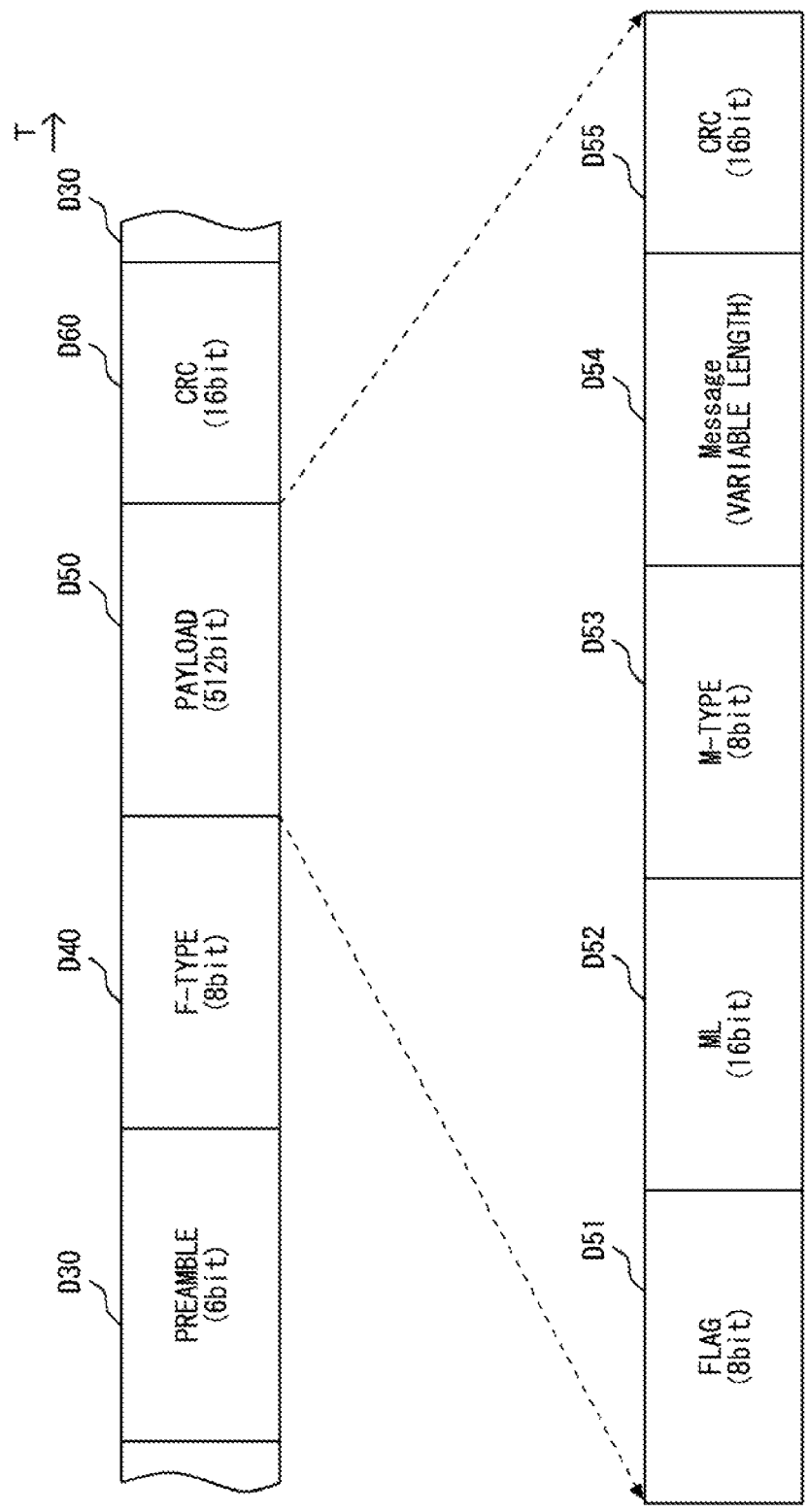

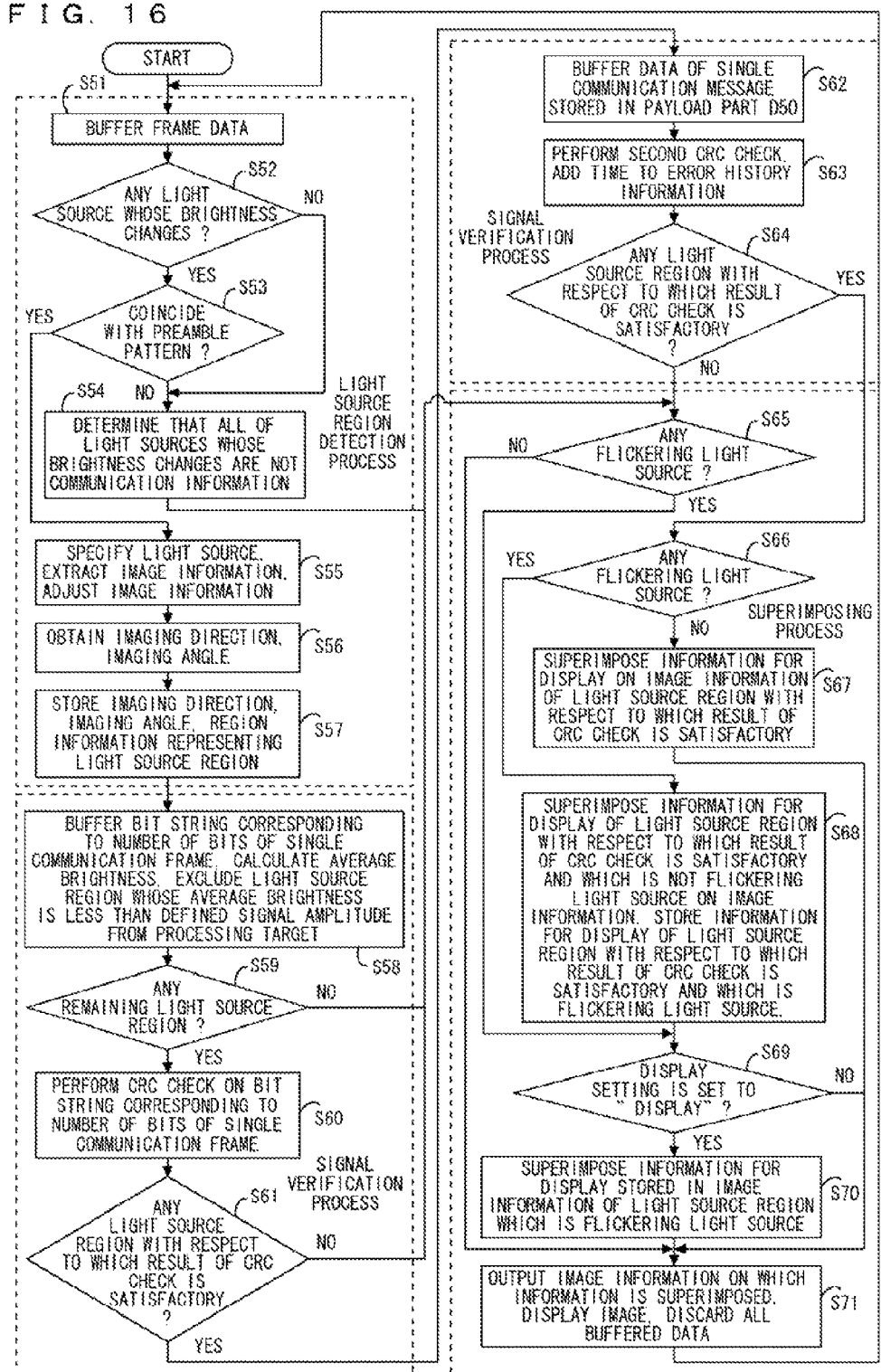

INFORMATION DISPLAY DEVICE, INTEGRATED CIRCUIT FOR DISPLAY CONTROL, DISPLAY CONTROL PROGRAM, AND DISPLAY CONTROL METHOD

BACKGROUND OF THE INVENTION

1. Technical Field

The present invention relates to information display devices for superimposing information for display on time-sequentially taken images and display the information, and more particularly to a technique that can suppress an adverse effect to a display screen when a reception condition of transmission from an information source is unstable and thereby improve readability.

2. Background Art

Patent Literature 1 discloses an imaging device which transmits information by means of optical space transmission, and thereby presents information relating to commercial products, exhibits, and the like such that the information is superimposed on taken images and displayed. According to Patent Literature 1, an information source which is provided together with store shelves for commercial products lined at a store front, an advertising board on the street, or the like, transmits presentation information that suits the commercial products or the advertising board by changing brightness. Meanwhile, an imaging device time-sequentially takes images, extracts presentation information for each image region based on change in brightness of the image region, and superimposes the extracted presentation information on the taken images and display the presentation information. Accordingly, relationship between a target for presentation information and the presentation information can be clarified, thereby preventing the information from being conveyed erroneously.

At this time, in the imaging device of Patent Literature 1, when a great number of light sources for transmitting presentation information exist within a viewing angle and extracted information exceeds an allowable amount, readability can be deteriorated significantly. Thus, in such a case, special consideration and the like needs to be given to selection of information and display style.

Patent Literature 2 discloses an information display device that can solve such problems. According to Patent Literature 2, based on data representing a size and a shape of an information source and an area on an image, a distance to the information source is calculated, and in accordance with the calculated distance, a size of a speech bubble and a character size are adjusted, thereby improving readability.

CITATION LIST

Patent Literature

[PTL 1] Japanese Laid-Open Patent Publication No. 2001-245253
[PTL 2] Japanese Laid-Open Patent Publication No. 2008-085555

SUMMARY OF THE INVENTION

In Patent Literature 2, it is supposed that information can be obtained always accurately from all of the information sources within the viewing angle. However, in an actual imaging condition, there may be a case where a reception condition of transmission from an information source among the information sources is unstable, and information can be obtained only intermittently because of passing-by pedestrians, trains, automobiles, and the like. Patent Literature 2 does not consider any measure against such a situation. Specifically, in a case where a reception condition of transmission from an information source is unstable and information from the information source is superimposed on taken images and displayed by the information display device of Patent Literature 2, information blinks on and off as states of display and non-display of the information are alternately repeated, which makes the information difficult to be viewed. There is also a case where, when states of display and non-display of the information are alternately repeated and a display region of the information is comparatively large, a display size, a written position and the like of other information are changed at times of switching between the display states. In such a case, readability can be deteriorated significantly.

Therefore, an objective of the present invention is to provide an information display device, an integrated circuit for display control, a display control program, and a display control method which transmits information by means of optical space transmission and thereby superimposes information on taken images and displays the information and which can, even when a reception condition of transmission from an information source among information sources is unstable, suppress an adverse effect to a display screen due to the information source, thereby improving readability.

The present invention is directed to an information display device, an integrated circuit for display control, a display control program, and a display control method. In order to achieve the above objective, the information display device of the present invention is an information display device for superimposing information for display on time-sequentially taken images and display the information on a display device, including an imaging section, an information processing section, and a display control section. The imaging section time-sequentially takes images. The information processing section extracts, from one or a plurality of regions whose brightness changes with time in the images taken by the imaging section, communication information containing information for display of each region based on change in brightness of the region; and generates stability information representing a degree of stability of a communication state of the communication information. The display control section superimposes the information for display contained in the communication information of each region extracted by the information processing section on the images taken by the imaging section, in a mode determined in accordance with the corresponding stability information generated by the information processing section, and displays the information for display superimposed on the images on the display device.

Preferably, the display control section receives display setting from a user, which indicates as to whether the information for display contained in the communication information corresponding to a region in an unstable communication state should be displayed or should not be displayed on the display device and stores the display setting, and when the stored display setting indicates that the information for display should not be displayed, the display control section superimposes the information for display contained in the communication information which is determined to be in a stable communication state based on the stability information on the images taken by the imaging section and displays the information for display superimposed on the images on the display device, and discards the communication information which is determined to be in an unstable communication state, while when the stored display setting indicates that the information for display should be displayed, the display control section stores the information for display contained in the communication information which is determined to be in an unstable communication state based on the stability information, and superimposes the stored information for display on the images taken by the imaging section and display the information for display superimposed on the images on the display device continuously while the communication information is determined to be in an unstable communication state.

Preferably, the information processing section: counts, with respect to each region, a number of errors representing a number of times the communication information has failed to be extracted and a number of times of status change representing a number of times a status in which the communication information can be extracted has switched to/from a state in which the communication information cannot be extracted during the most recent predetermined interval; determines, when both of conditions that the number of errors is greater than or equal to a defined number N and that the number of times of status change is greater than or equal to a defined number M are satisfied, that the communication information is in an unstable communication state; and determines, when either condition is not satisfied, that the communication information is in a stable communication state.

Preferably, the information processing section: counts, with respect to each region, an error rate representing a rate at which the communication information has failed to be extracted and a number of times of status change representing a number of times a status in which the communication information can be extracted has switched to/from a state in which the communication information cannot be extracted during the most recent predetermined interval; determines, when both of conditions that the error rate is greater than or equal to a defined number L and that the number of times of status change is greater than or equal to a defined number M are satisfied, that the communication information is in an unstable communication state; and determines, when either condition is not satisfied, that the communication information is in a stable communication state.

Preferably, the information processing section calculates an average brightness of each of the respective regions and excludes those regions with respect to which the average brightness is less than a predetermined value from processing targets.

Preferably, the display control section superimposes the information for display contained in the communication information which is determined to be in a stable communication state based on the stability information on the images taken by the imaging section and displays the information for display superimposed on the images on the display device, and discards the communication information which is determined to be in an unstable communication state.

Preferably, the display control section stores the information for display contained in the communication information which is determined to be in an unstable communication state based on the stability information, and superimposes the stored information for display on the images taken by the imaging section and display the information for display superimposed on the images on the display device continuously while the communication information is determined to be in an unstable communication state.

Preferably, the display control section, when a communication state is determined to be unstable based on testability information, substantially reduces an occupation area for superimposing the information for display on the images so as to be smaller than an occupation area when the communication state is determined to be stable.

Preferably, the display control section, at a time of substantially reducing the occupation area, reduces an amount of information, reduces a character to be displayed in size, reduces a mark to be displayed in size, reduces a speech bubble in size, changes an order of superimposing the speech bubble so as to be superimposed at a lower level, or increases the transmissivity of the speech bubble.

Preferably, the display control section, at a time of substantially reducing the occupation area, further changes a color of the character to be displayed, changes a color of the mark to be displayed, or changes a color of the speech bubble.

Preferably, the communication information of each region extracted by the information processing section includes a plurality of pieces of the information for display, and each piece of the information for display are associated with priorities, respectively, and the display control section determines priority of each of the respective regions based on the stability information, and displays the information for display corresponding to the determined priority on the display device.

Preferably, the information processing section, at a time of extracting the communication information, determines, with respect to each of the respective regions, whether at least one of a condition that brightness is less than a defined value and a condition that an error rate is greater than a defined value are satisfied, and causes the stability information of each of those regions which satisfy at least one of the conditions to indicate that a communication state is unstable.

Preferably, the display control section superimposes the information for display of each region in association with an image of the region in the images taken by the imaging section.

Preferably, the information processing section, when there is a plurality of light sources, in the images taken by the imaging section, which outputs the same information, process the plurality of light sources as a single region.

Preferably, the information processing section, in the single region in which the plurality of light sources output the same information, at a time of extracting the communication information, calculates an error rate based on a number of light sources whose communication information has failed to be extracted, determines whether the error rate is greater than a defined value, and causes the stability information of the region with respect to which the error rate has been determined to be greater than the defined value to indicate that a communication state is unstable.

Preferably, the display control section determines, in the single region in which the plurality of light sources output the same information, at a time of extracting the communication information, a position at which the information for display is superimposed based only on positions of those light sources with respect to which a failure rate of extracting the communication information is less than a defined value.

In order to achieve the above objective, the integrated circuit for display control of the present invention is an integrated circuit used for an information display device for superimposing information for display on images time-sequentially taken by an imaging section and displaying the information for display superimposed on the images on a display device, including circuitry functioning as an information processing section, and a display control section. The information processing section extracts, from one or a plurality of regions whose brightness changes with time in the images taken by the imaging section, communication information containing information for display of each region based on change in brightness of the region; and generates stability information representing a degree of stability of a communication state of the communication information. The display control section superimposes the information for display contained in the communication information of each region extracted by the information processing section on the images taken by the imaging section, in a mode determined in accordance with the corresponding stability information generated by the information processing section, and displays the information for display superimposed on the images on the display device.

In order to achieve the above objective, the display control program of the present invention is executed by an information display device for superimposing information for display on time-sequentially taken images and displaying the information for display superimposed on the images on a display device, the program causing the information display device to execute an imaging step, an information processing step, and a display control step. The imaging step is a step of time-sequentially taking images. The information processing step is a step of extracting, from one or a plurality of regions whose brightness changes with time in the images taken in the imaging step, communication information containing information for display of each region based on change in brightness of the region; and generating stability information representing a degree of stability of a communication state of the communication information. The display control step is a step of superimposing the information for display contained in the communication information of each region extracted by the information processing section on the images taken in the imaging step, in a mode determined in accordance with the corresponding stability information generated in the information processing step, and displaying the information for display superimposed on the images on the display device.

In order to achieve the above objective, the display control method of the present invention is an information display method for superimposing information for display on time-sequentially taken images and displaying the information for display superimposed on the images on a display device, including an imaging step, an information processing step, and a display control step. The imaging step is a step of time-sequentially taking images. The information processing step is a step of extracting, from one or a plurality of regions whose brightness changes with time in the images taken in the imaging step, communication information containing information for display of each region based on change in brightness of the region; and generating stability information representing a degree of stability of a communication state of the communication information. The display control step is a step of superimposing the information for display contained in the communication information of each region extracted by the information processing section on the images taken in the imaging step, in a mode determined in accordance with the corresponding stability information generated in the information processing step, and displaying the information for display superimposed on the images on the display device.

As described above, according to the present invention, information for display of each region can be superimposed on taken images and displayed on an external display device in a mode determined in accordance with stability of a reception condition of the region. According to the features of the present invention, information for display that corresponds to a region in an unstable reception condition is stored so that the stored information for display can be continuously displayed on a display device, or the information that corresponds to the region in an unstable reception condition can be discarded, and thereby the information for display can be prevented from being intermittently hidden, resulting in improved readability.

Further, according to the features of the present invention, an occupation area of the information that corresponds to the region in a unstable reception condition, which is intermittently hidden can be substantially reduced and displayed so as to be less prominent and less represented, and thus even if the information which is less represented is intermittently hidden, readability can be prevented from being deteriorated significantly and can be improved significantly.

Further, according to the features of the present invention, information that corresponds to a region with low visibility can be displayed so as to be less prominent, and the information can be superimposed on images in accordance with how clear the information source comes out on the images, in an appropriate display style for the information without causing discomfort.

BRIEF DESCRIPTION OF THE DRAWING

FIG. 15 illustrates an example of data format of communication information which is transmitted from an information source 600 to an information display device 700 based on the intensity of light.

FIG. 16 illustrates a series of procedure from a light source region detection process through to a signal verification process and a superimposition process in the second embodiment.

DETAILED DESCRIPTION OF THE INVENTION

First Embodiment

<Outline>

The first embodiment is applied to a system which transmits information by means of optical space transmission, superimposes information on taken images, and displays the information. According to the present embodiment, a manner of superimposing the information is changed in accordance with the degree of stability of a communication state of each light source. Specifically, information from a light source in an unstable communication state is displayed so as to be less prominent by, for example, substantially reducing an occupation area of the information, thereby improving readability.

<Configuration>

Figure 1:
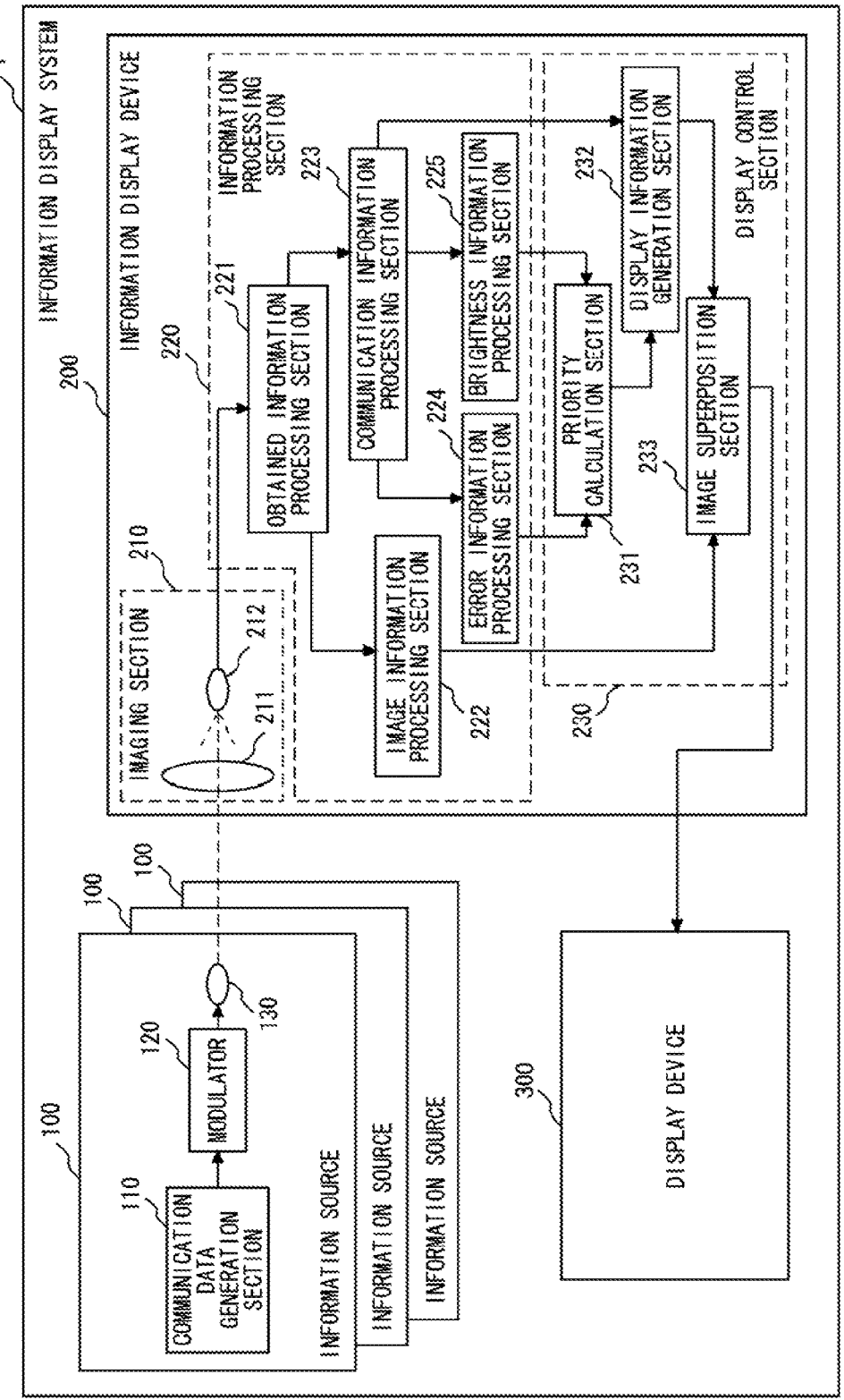
FIG. 1 illustrates an outline of a functional configuration of an information display system 1 of a first embodiment according to the present invention.

FIG. 1 illustrates an outline of a functional configuration of an information display system 1 of the first embodiment according to the present invention.

The information display system 1 shown in FIG. 1 includes an information source 100, an information display device 200, and a display device 300.

The information source 100 is a stationary electronic equipment provided together with store shelves for commercial products lined at a store front or an advertising board on the street, having a function of transmitting information for display. The information source 100 includes a communication data generation section 110, a modulator 120, and an information transmission light sources 130.

The information display device 200 is, for example, a portable electronic equipment having an imaging function such as a digital camera, a mobile phone with camera, having a function of: obtaining information for display via an optical wireless communication; superimposing the information for display on a taken video image; and displaying the information. The information display device 200 includes an imaging section 210, an information processing section 220, and a display control section 230.

The display device 300 is an image display device such as an LCD monitor.

The communication data generation section 110 generates information for display to be displayed on the information display device 200.

The modulator 120 converts the information for display generated by the communication data generation section 110 into an electric signal.

The information transmission light sources 130 are each a device which is capable of emitting light of a comparatively high intensity of a certain degree or more such as an LED, a fluorescent light, or the like, and which transmits, by using the electric signal converted by the modulator 120, communication information including the information for display to the information display device 200 based on the intensity of light.

The imaging section 210 time-sequentially takes images, and includes: a lens 211 for adjusting an image formation state of an incident light; and an image sensor 212 for converting an intensity of light obtained through the lens 211 to an electric signal to generate photoelectric conversion information and taking images by sequentially outputting the photoelectric conversion information to the information processing section 220. Here, an image sensor is used as a photoelectric transducer. However, the image sensor is not limited thereto and may be any element capable of converting an intensity of light to an electric signal representing brightness information. For example, the imaging section 210 may include a two-dimensional photodiode array instead of the image sensor 212.

The information processing section 220 specifies, from among the images taken by the imaging section 210, all of light source regions whose brightness changes in a predetermined pattern with time, and from each of the specified one or more light source regions, extracts communication information based on the change in brightness of the light source region, and generates stability information representing a communication state (an average error rate, an amplitude of fluctuation of error rate, an average brightness, and the like). The information processing section 220 includes an obtained information processing section 221, an image information processing section 222, a communication information processing section 223, an error information processing section 224, and a brightness information processing section 225.

The display control section 230: superimposes the information for display contained in the communication information of each region extracted by the information processing section 220 on the images taken by the imaging section 210, in a manner based on the corresponding stability information generated by the information processing section 220; adjusts the brightness and size of the information for display; and displays the information for display on the display device 300 which is externally provided. The display control section 230 includes a priority calculation section 231, a display information generation section 232, and an image superposition section 233.

The obtained information processing section 221 extracts image information to be used for image analysis based on the photoelectric conversion information generated by the image sensor 212 of the imaging section 210, and outputs the image information to the image information processing section 222. The obtained information processing section 221 further specifies the light sources which are the information source, and sets a light source region for each light source. Then, the obtained information processing section 221 extracts brightness information representing temporal change in brightness of each light source region having been set, and outputs, in association with the extracted brightness information, the region information representing the set light source region to the communication information processing section 223.

The image information processing section 222 performs an image information process of converting a color space, adjusting a viewing angle, and the like, required for outputting images on a screen, on the image information extracted by the obtained information processing section 221 so as to adjust the image information for display, and outputs the adjusted image information to the image superposition section 233.

The communication information processing section 223, with respect to each light source region represented by the region information extracted by the obtained information processing section 221, recognizes the temporal change in brightness represented by the brightness information extracted by the obtained information processing section 221 as either a bit "0" or a bit "1," thereby generates communication information, and outputs the communication information together with the region information to the display information generation section 232. Further, the communication information processing section 223 calculates, at a time of generating the communication information, an error rate indicating a rate at which communication errors have occurred, outputs the error rate together with the region information to the error information processing section 224, and outputs the brightness information together with the region information to the brightness information processing section 225.

The error information processing section 224 calculates an average error rate and an amplitude of fluctuation of error rate based on the error rate of each light source region calculated by the communication information processing section 223, and outputs the average error rate and the amplitude of fluctuation of error rate to the priority calculation section 231. The calculating method of the amplitude of fluctuation of error rate will be described later in detail.

The brightness information processing section 225 calculates an average of the brightness represented by the brightness information of each light source region based on the brightness information of each light source region extracted by the obtained information processing section 221, and outputs the average brightness to the priority calculation section 231. The calculating method of the average of the brightness represented by the brightness information will be described later in detail.

Based on the average error rate and the amplitude of fluctuation of error rate calculated by the error information processing section 224, and the average of the brightness represented by the brightness information calculated by the brightness information processing section 225, the priority calculation section 231 calculates a priority for determining a display mode for displaying the communication information of each light source region, and outputs the priority to the display information generation section 232. For example, the priority calculation section 231 determines that a communication state of a region is unstable when at least one of a condition that the brightness is lower than a defined value and a condition that the error rate is greater than a defined value is satisfied, and sets the priority of the region so as to be lower than that when the communication state of the region is determined to be stable. The calculating method for the priority will be described later in detail.

Based on the information for display contained in the communication information of each light source region generated by the communication information processing section 223, the display information generation section 232: determines information for superimposition and a display mode of the information in accordance with the priority of each light source region calculated by the priority calculation section 231 based on the stability information; and outputs the information and the display mode to the image superposition section 233.

The image superposition section 233 superimposes the information for superimposition determined by the display information generation section 232, in the determined display mode, on the image information on which the image information process has been performed by the image information processing section 222, and outputs the superimposed information to the display device 300 to displays images.

For example, when the priority is low (the communication state is determined to be comparatively unstable based on the stability information), the occupation area for superimposing the information for display on images is substantially reduced so as to be smaller than that when the priority is high (the communication state is determined to be comparatively stable based on the stability information). Here, the occupation area can be substantially reduced specifically by one of or combination of reducing an amount of information, reducing a character to be displayed in size; reducing a mark to be displayed in size, reducing a speech bubble to be displayed in size, changing the order of superimposing the speech bubble so as to be a lower level, increasing the transmissivity, and the like. Furthermore, when reducing the occupation area, it is more effective if a color of the character to be displayed, a color of the mark to be displayed, a color of the speech bubble to be displayed, or the like is changed to a comparatively less prominent color, a quiet color, a color close to a background color, or the like.

The image superposition section 233 may superimpose the information for display of each light source region at a position in accordance with a position of the light source region. More specifically, for example, the information for display may be superimposed at the corresponding position of the light source region, may be connected with the corresponding position of the light source region with an arrow, or the like, or may be described in a speech bubble popping up from the position of the light source region.

Figure 2:
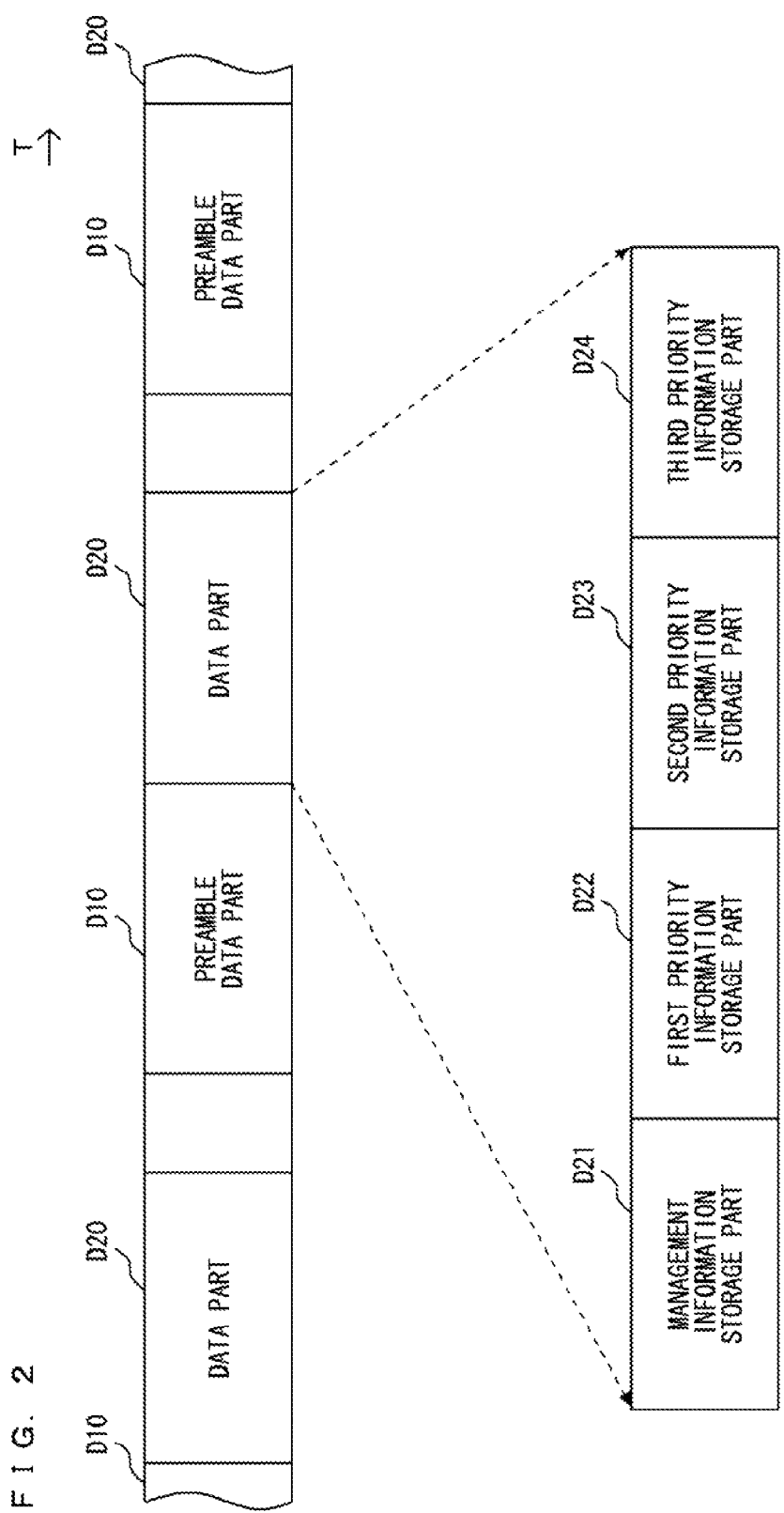
FIG. 2 illustrates an example of data format of communication information transmitted from an information source 100 to an information display device 200 based on an intensity of light.

FIG. 2 illustrates an example of data format of the communication information transmitted from the information source 100 to the information display device 200 based on the intensity of light. In FIG. 2, "→" represents a travelling direction of a time T.

As shown in FIG. 2, the data format of the communication information includes a preamble data part D10 and a data part D20, and these are outputted repeatedly in rotation from the information source 100.

Data stored in the preamble data part D10 is for the information display device 200 to recognize that the data is communication information containing information for display, including a preamble pattern which is fixed data representing a starting point of the data part D20.

Data stored in the data part D20 includes a management information storage part D21, a first priority information storage part D22, a second priority information storage part D23, and a third priority information storage part D24.

The management information storage part D21 stores management information of priority information representing the number of the subsequent priority information storage parts, a length (length of character string) of priority information stored in each priority information storage part, and the like. FIG. 2 shows an example in which the number of pieces of priority information is "3". When the number is "1," only the first priority information storage part D22 follows the management information storage part D21. When the number is "2," the first priority information storage part D22 and second priority information storage part D23 follow the management information storage part D21. Generally, when the number is N (N is a natural number of one or more), N numbers of priority information storage parts follow the management information storage part D21.

The first priority information storage part D22 stores first priority information which is information for display of the highest priority. The information stored in the first priority information storage part D22 is ranked as the important information that should be most preferentially displayed, and thus even when the communication state is determined to be comparatively unstable, the first priority information is displayed in any way possible.

The second priority information storage part D23 stores second priority information which is information for display of the second highest priority next to the first priority information storage part D22. The third priority information storage part D24 stores third priority information which is information for display with the third highest priority next to the second priority information storage part D23. Generally, an N-th priority information storage part stores N-th priority information which is information for display with the N-th priority. Here, when the communication state is determined to be stable, all of information from the first priority information to the N-th priority information is displayed in any way possible in order of priority.

It should be noted that the number of priority information in FIG. 2 may be always "one" so that information for display is always a single piece of priority information. Alternatively, a single piece of information for display may be transmitted without previously assigning priorities.

When the number of priority information in FIG. 2 is "two" or more, for example, the image superposition section 233 superimposes only the first priority information on images when the communication state is most unstable. Meanwhile, when the communication state is stable, the image superposition section 233 increases the number of priority information to be superimposed based on the priorities and adjusts the amount of information to be superimposed on the images based on the priorities.

<Operation>

Figure 3:
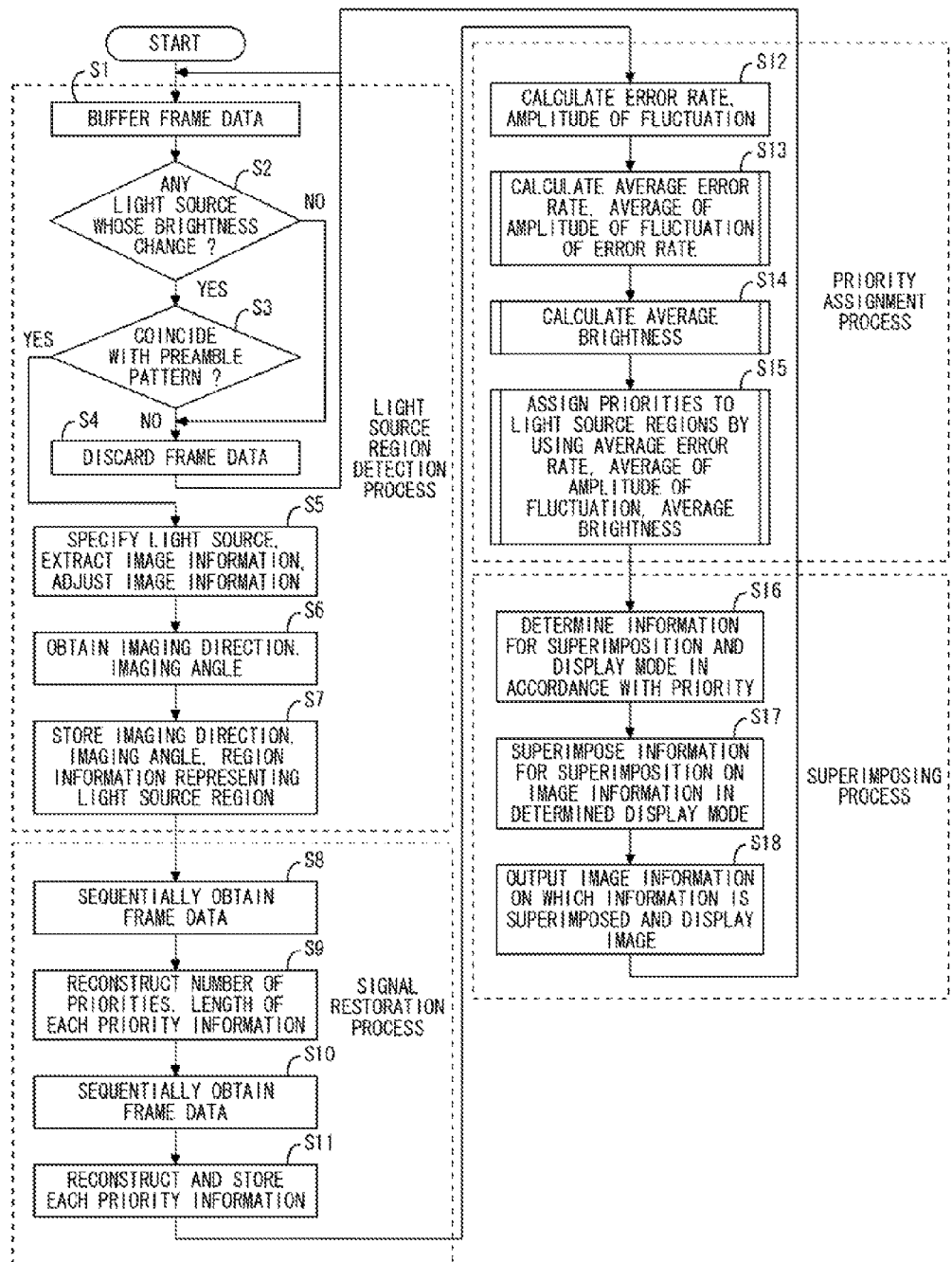
FIG. 3 illustrates a series of procedure performed in the present embodiment.

FIG. 3 illustrates a series of procedure, performed in the first embodiment, from a light source region detection process through to a signal restoration process, a priority assignment process, and a superimposition process of superimposing information for display on taken images and displaying the information.

Steps S1 to S7 are process steps of the light source region detection process.

(1) The obtained information processing section 221 buffers images taken by the image sensor 212 as a plurality of frame data corresponding to the number of bits of the preamble data part D10 (step S1).

(2) With respect to the plurality of frame data buffered in step S1, it is determined whether there is any light source whose brightness changes (step S2).

(3) When it is determined that there is a light source whose brightness changes (step S2: YES), the obtained information processing section 221 compares the buffered frame data with the preamble pattern in the preamble data part D10 to determine whether these coincide with each other (step S3).

(4) When it is determined that there is no light source whose brightness changes (step S2: NO), and when there is no light source whose frame data does not coincide with the preamble pattern (step S3: NO), the obtained information processing section 221 determines that the buffered frame data is not communication information and discards the buffered frame data, then the process returns to buffering (step S1) frame data of (step S4).

(5) When it is determined that there is a light source whose buffered frame data coincides with the preamble pattern (step S3: YES), the obtained information processing section 221: specifies the light source whose brightness changes and whose buffered frame data has been determined to coincide with the preamble pattern, as the light source which transmits the communication information containing data for display; and extracts image information to be used for image analysis. Further, the image information processing section 222 adjusts the extracted image information for display (step S5).

(6) The obtained information processing section 221 obtains an imaging direction and an imaging angle by using a gyroscope, a direction magnet, or the like (step S6).

(7) The imaging direction and the imaging angle obtained in step S6 are stored together with the region information representing the light source region including the light source whose brightness changes (step S7).

Steps S8 to S11 are process steps of the signal restoration process.

(8) The communication information processing section 223 sequentially obtains the plurality of frame data corresponding to the number of bits of the management information storage part D21 shown in FIG. 2 from the light source region represented by the region information stored in step S7 (step S8).

(9) Based on the plurality of frame data obtained in step S8, the management information of the priority information such as the number of priorities and the length of priority information is reconstructed (step S9).

(10) Based on the management information of the priority information reconstructed in step S9, the plurality of frame data corresponding to the number of bits of each of the first priority information storage part D22, the second priority information storage part D23, the third priority information storage part D24, and the like shown in FIG. 2 are sequentially obtained (step S10).

(11) Based on the plurality of frame data obtained in step S10, each priority information (data for display according to priority) is reconstructed and stored (step S11).

Steps S12 to S15 are process steps of the priority assignment process.

(12) An error rate, and an amplitude of fluctuation representing a difference between an error rate and the immediately preceding error rate during the process of reconstructing the management information storage part D21, the first priority information storage part D22, the second priority information storage part D23, the third priority information storage part D24, and the like in steps S8 to S11, are calculated and stored (step S12).

(13) The error information processing section 224 calculates an average error rate and an average amplitude of fluctuation of error rate by using the error rate and the amplitude of fluctuation calculated in step S12 (step S13). Details will be described later in the detailed process step of step S13 shown in FIG. 4.

(14) Based on the frame data obtained in steps S1 to S11, the brightness information processing section 225 calculates an average brightness by using the brightness of each light source region (step S14). Details will be described later in the detailed process step of step S14 shown in FIG. 5.

(15) The priority calculation section 231 assigns priorities to the respective light source regions by using the average error rate, the average of the amplitude of fluctuation of error rate, and the average brightness calculated in step S13 and step S14 (step S15). Details will be described in the detailed process step of step S15 shown in FIG. 6.

The steps S16 to S18 are process steps of the superimposition process.

(16) Based on the information for display contained in the communication information of each light source region, the display information generation section 232 determines the information for superimposition and a display mode of the information in accordance with the priority assigned to each light source region in step S15 (step S16).

(17) The image superposition section 233 superimposes the information for superimposition determined in step S16 on the image information with respect to which the image information process has been performed in step S5, in the determined display mode (step S17).

(18) The image information on which the information has been superimposed in step S17 is outputted to the display device 300 and images are displayed (step S18).

Figure 4:
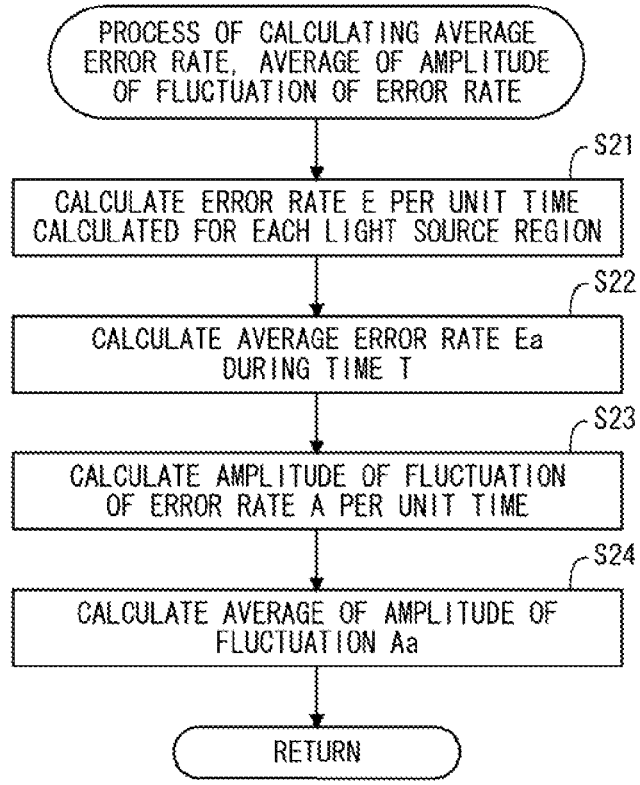
FIG. 4 illustrates in detail a procedure of calculating an average error rate and an average amplitude of fluctuation of error rate.

FIG. 4 illustrates in details a procedure of calculating an average error rate and an average amplitude of fluctuation of error rate in step S13 of FIG. 3.

(1) The error information processing section 224 calculates an error rate E per unit time calculated for each light source region (step S21).

(2) An average error rate Ea during a time T is calculated (step S22). For example, an error rate during the last one second is represented as Eo.

(3) The error information processing section 224 calculates an amplitude of fluctuation of error rate A per unit time calculated for each light source region (step S23).

(4) An average amplitude of fluctuation Aa during the time T is calculated (step S24). For example, an amplitude of fluctuation of error rate during the last one second is represented as Ao.

Figure 5:
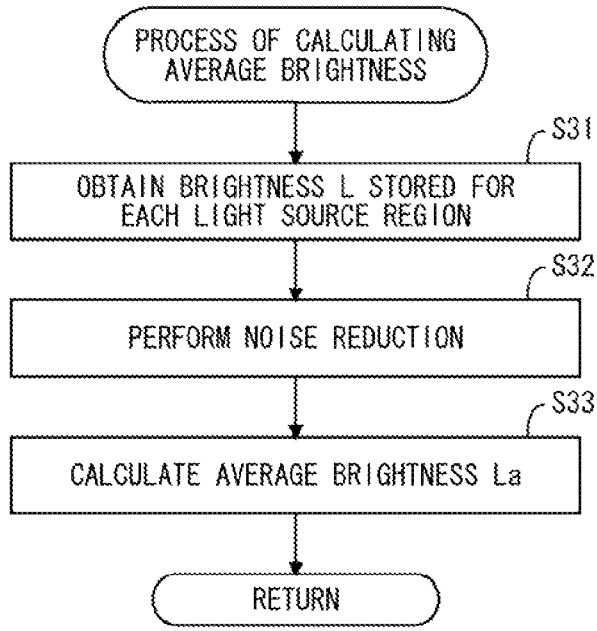
FIG. 5 illustrates in detail a procedure of calculating an average brightness.

FIG. 5 illustrates in detail a procedure of calculating an average brightness in step S14 of FIG. 3.

(1) The brightness information processing section 225 obtains brightness L stored for each light source region (step S31).

(2) A noise reduction process is performed (step S32).

(3) An average brightness La during the time T is calculated (step S33). For example, brightness during the last one second is represented as Lo.

In order to reduce effects of disturbances, for example, the noise reduction process is performed here by: calculating a second minimum and a second maximum (Lmin2=Lmin× 1.05, Lmax2=Lmax×0.95) by subtracting, from a minimum and a maximum (Lmin, Lmax) of receiving sensitivity/capability of the information display device 200, a several % (e.g. 5%) from the minimum and the maximum, respectively; and calculating the average brightness La by using only the brightness of between the second minimum and the second maximum, thereby reducing noise in each light source region. It should be noted that the noise reduction process described here is a mere example and thus another noise reduction process may be performed or no noise reduction may be performed.

Figure 6:
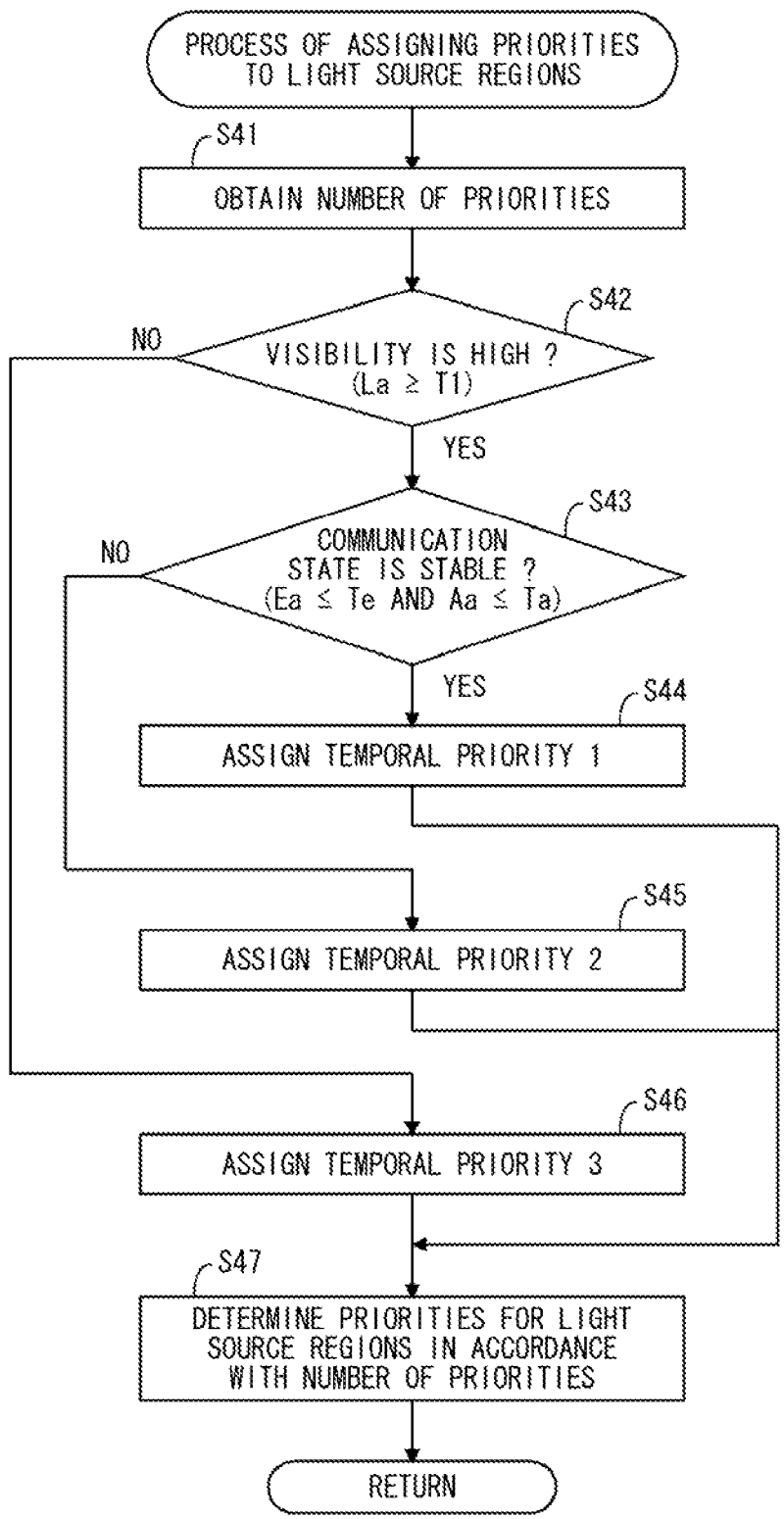
FIG. 6 illustrates in detail a procedure of assigning priorities to respective light source regions.

FIG. 6 illustrates in detail a procedure of assigning priorities to the respective light source regions in step S15 of FIG. 3.

(1) The priority calculation section 231 obtains the number of priorities to be set to the respective light source regions based on the number of priorities reconstructed in step S9 of FIG. 3 (step S41).

(2) Based on a threshold T1 corresponding to a predetermined brightness, the priority calculation section 231 determines, from the average brightness La calculated for each light source region, whether visibility of the light source region is high (La≥T1) or low (La<T1) (step S42). Here, the predetermined brightness is 1.5 times as bright as a minimum brightness that can be received by the information display device 200.

(3) With respect to the light source region whose visibility has been determined to be high in step S42, the priority calculation section 231 determines, from the average error rate Ea and an average amplitude of fluctuation of error rate Aa, whether the communication state is stable (Ea≤Te AND Aa≤Ta) or unstable (Ea>Te OR Aa>Ta) based on a threshold Te and a threshold Ta (step S43). Here, the threshold Te of the error rate is 50% and the threshold Ta of the amplitude of fluctuation of error rate is 20%.

(4) The priority calculation section 231 assigns a temporal priority 1 to a light source region whose visibility has been determined to be high and the communication state has been determined to be stable (step S44).

(5) The priority calculation section 231 assigns a temporal priority 2 to a light source region whose visibility has been determined to be high and the communication state has been determined to be unstable (step S45).

(6) The priority calculation section 231 assigns a temporal priority 3 to a light source region whose visibility has been determined to be low (step S46).

(7) The priority calculation section 231 determines priorities for the respective light source regions in accordance with the number of priorities to be set having been obtained in step S41 (step S47).

For example, with respect to one light source region, when the number of priorities to be set is three, the number coincides with the number of temporal priorities assigned in steps S44 to S46 and thus the temporal priorities remain as the priorities. Alternatively, when the number of temporal priorities is less than the number of priorities to be set as in the case where the number of priorities to be set is two which is "high" and "low", more than one temporal priorities are associated with one priority by, for example, assigning the priority high to the temporal priority 1, and assigning the priority low to the temporal priority 2 and the temporal priority 3. Alternatively, when the number of priorities to be set is greater than the temporal priorities as in the case where the number of priorities to be set is six, every other temporal priority is associated with each priority by, for example, assigning the first priority, the third priority, and the fifth priority to the temporal priority 1, the temporal priority 2, and the temporal priority 3, respectively.

<Example of Use>

Figure 7:
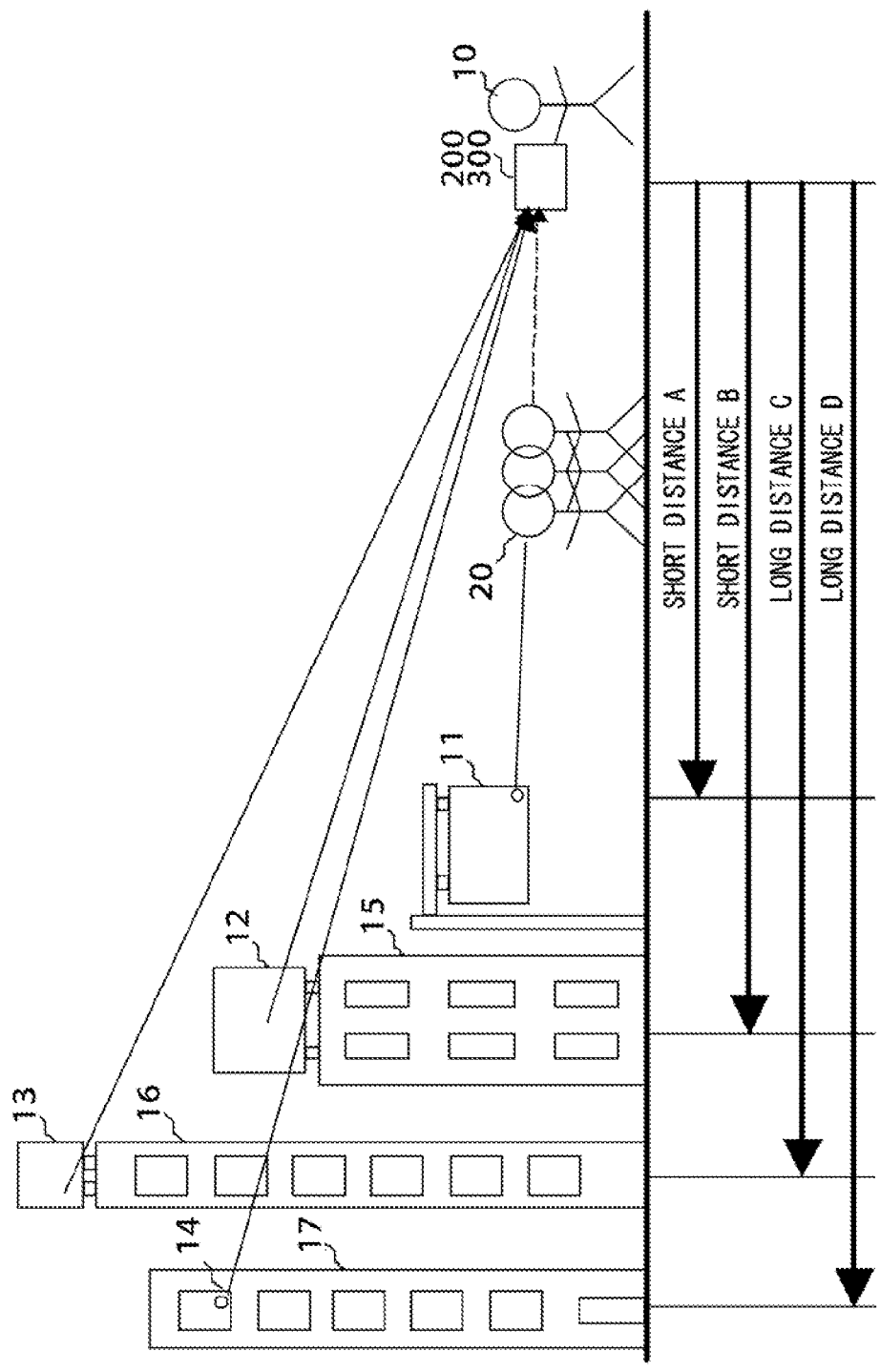
FIG. 7 illustrates an example of positional relationship among the information source 100, the information display device 200, and a display device 300 of the present embodiment when being used.

FIG. 7 illustrates an example of positional relationship among the information source 100, the information display device 200, and the display device 300 of the present embodiment when being used.

In FIG. 7, a total of four information sources 100 which are present at respective positions at a short distance A (e.g. 3 m), a short distance B (e.g. 5 m), a long distance C (e.g. 100 m), and a long distance D (e.g. 150 m) with reference to a standing position of an operator 10 holding the information display device 200 and the display device 300. At the short distance A, a traffic sign 11 having a point light source of the information source 100 installed therein is present. On the top of a building 15 at the short distance B, an advertising board 12 having a surface light source of the information source 100 installed therein is present. On the top of a building 16 at the long distance C, an advertising board 13 having a surface light source of the information source 100 installed therein is present. On or around a highest floor of a building 17 at the long distance D, an advertising board 14 having a point light source of the information source 100 installed therein is present. Further, between the traffic sign 11 and the operator 10 holding the information display device 200 and the display device 300, a plurality of passers-by 20 are present, moving from the operator 10 toward the traffic sign 11.

FIGS. 8 to 11 illustrate examples of an image displayed on the display device 300 of the present embodiment when being used. Here, time passes in order of FIGS. 8, 9, 10, and 11.

Figure 8:
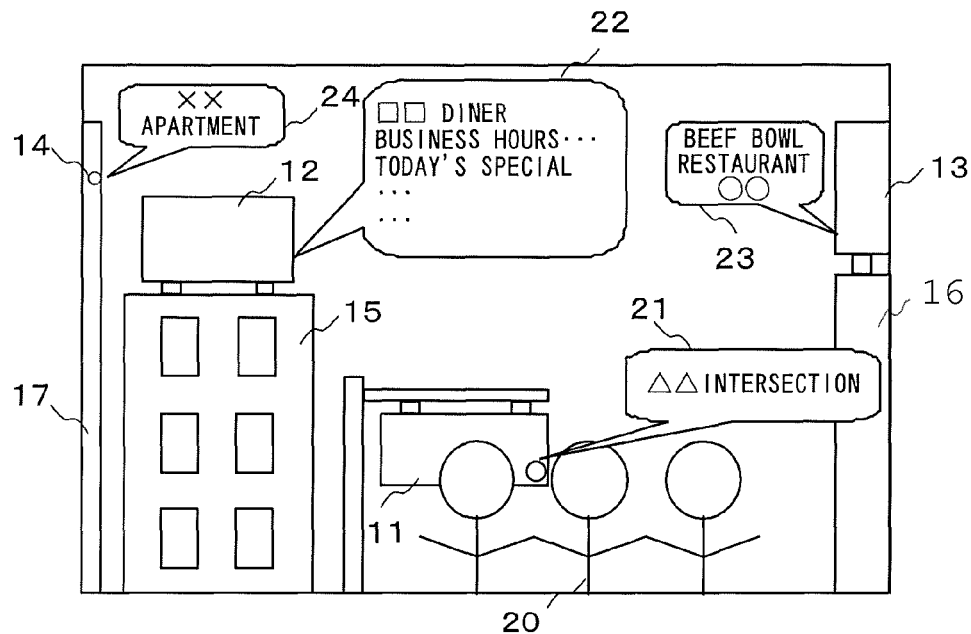
FIG. 8 illustrates an example of an image displayed on the display device 300 of the present embodiment when being used.

In FIG. 8, respective objects shown in FIG. 7 are displayed on the display device 300, with the passers-by 20 in front of the traffic sign 11. Further, speech bubbles 21 to 24 are popping up from the light sources, respectively, and each speech bubble contains information obtained from each light source. Here, the advertising board 13 and the advertising board 14 are at a long distance from each other, and information to be contained in the speech bubbles 23 and 24 is restricted by the conventional method of Patent Literature 2, and the like. Consequently, only outlines such as "Beef bowl restaurant ○○" and "xx apartment" are displayed and the speech bubbles 23 and 24 are relatively small in accordance with the outlines. Further, the traffic sign 11 is present at a comparatively short distance; however, the passers-by 20 become obstacles that intermittently hide the point light source, resulting in an unstable reception condition. Consequently, due to the characteristic configuration of the present embodiment, in the speech bubble 21 popping up from the point light source of the traffic sign 11, only an outline such as "ΔΔ intersection" is displayed, and the speech bubble 21 is relatively small in accordance with the outline. Further, the advertising board 12 is at a comparatively short distance, and there is no particular obstacle. Consequently, in the speech bubble 22 popping up from the advertising board 12, detailed information such as "□□ diner, business hours . . . , today's special . . . " is displayed, and the speech bubble 22 is relatively large in accordance with the information.

Figure 9:
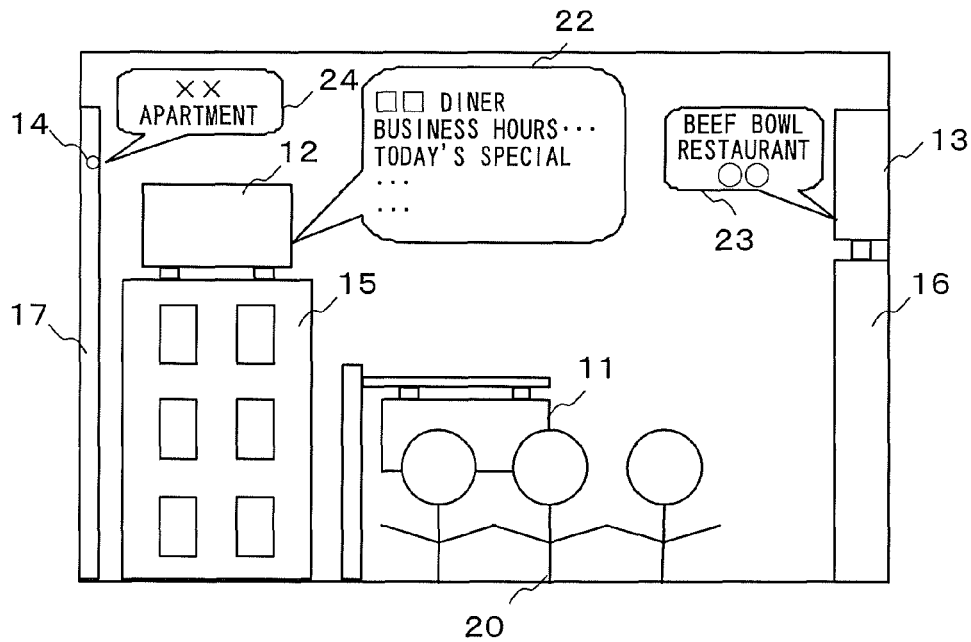
FIG. 9 illustrates an example of an image displayed on the display device 300 of the present embodiment when being used.

In FIG. 9, information respectively contained in speech bubbles 22, 23, 24 is the same as that in FIG. 8. However, because the passers-by 20 completely hide the point light source of the traffic sign 11, the speech bubble 21 is not displayed.

Figure 10:
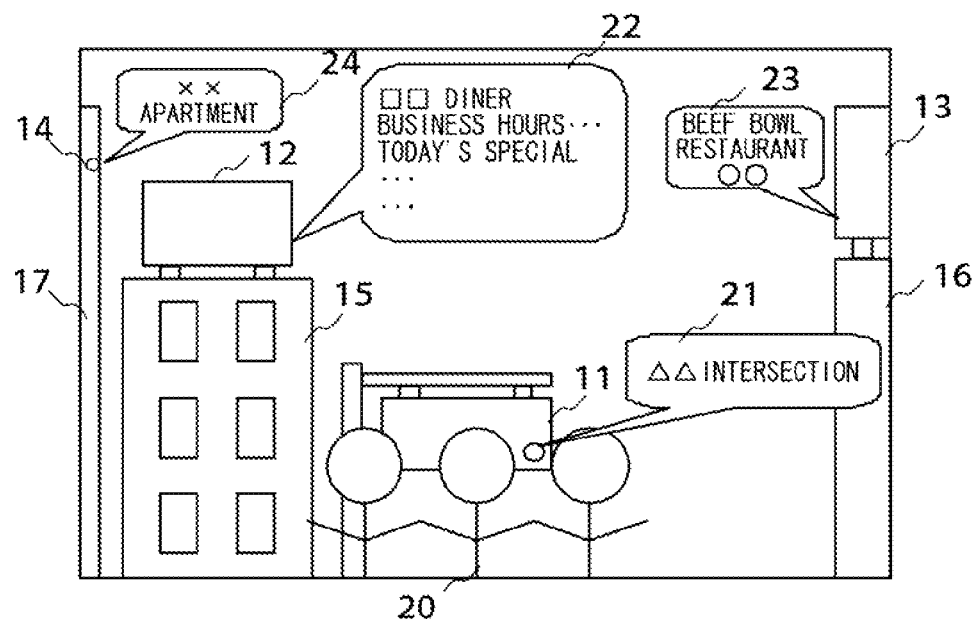
FIG. 10 illustrates an example of an image displayed on the display device 300 of the present embodiment when being used.

In FIG. 10, the point light source of the traffic sign 11 can be seen between the passers-by 20 despite an unstable reception condition, and thus only outlines are displayed in the speech bubbles as in the same manner as in FIG. 9.

Figure 11:
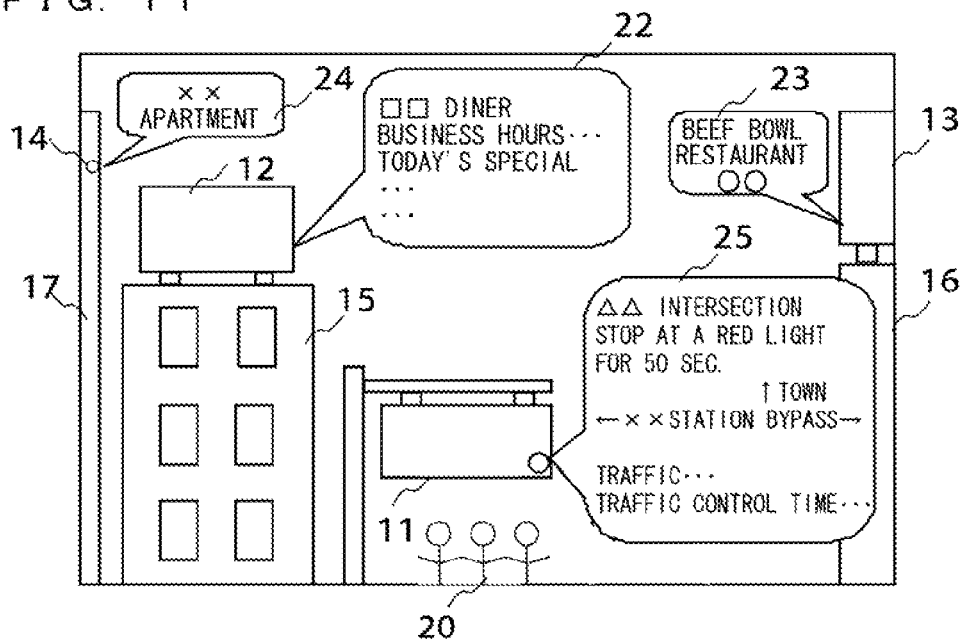
FIG. 11 illustrates an example of an image displayed on the display device 300 of the present embodiment when being used.

In FIG. 11, the passers-by 20 are no longer between the point light source of the traffic sign 11 and the operator 10 holding the information display device 200, and thus the reception condition is recovered. Consequently, in a speech bubble 25 popping up from the point light source of the traffic sign 11, detailed information such as "ΔΔ intersection, stop at a red light for 50 sec., ↑town, ←xx station, bypass→, traffic, . . . , traffic control time . . . " is displayed, and the speech bubble 22 is relatively large in accordance with the information.

As described above, when information from the information source 100 is intermittently displayed as states of display and non-display are alternately repeated, being interrupted by an object passing by and the like, only an outline is displayed without displaying detailed information so as to be less represented, thereby increasing readability.

In the above examples, a manner of display is changed by restricting an amount of information to be superimposed on images in accordance with the degree of stability of the communication state so that the information is less represented. However, the method of changing the manner of display is not limited to restricting the amount of information. For example, the manner of display can be changed by, for example, changing: a color and a size of a character, a mark, and the like; a color and a size of a speech bubble, and the like; a color and a thickness of a line; an order of superimposing frame speech bubbles; a degree of transmission of information to be displayed, speech bubble, and the like, so that the information is less represented.

Alternatively, when the information source is momentarily interrupted and intermittently seen, information may be continuously displayed instead of being in a non-display state or may be in a non-display state until the communication state becomes stable.

Further, the higher the visibility of the light source from which information is transmitted, the more preferential the information is regarded to be for presenting to a user. Consequently, the manner of display may be changed such that the information from a light source with higher visibility may be displayed so as to be more prominent.

<Summary>

According to the information display system 1 of the first embodiment, when information is superimposed on taken images and displayed by transmitting the information by means of optical space transmission, the visibility of the information source 100 seen from an operator operating the information display device 200 is considered. When a reception condition of transmission from any information source 100 among information sources 100 is unstable in such a case where the information source 100 is momentarily interrupted by a passer-by, and the like, the information from such an information source can be made less prominent so as to be less represented. Thus, even if the information which is displayed so as to be less represented due to the unstable reception condition is intermittently displayed as states of display and non-display are alternately repeated, readability can be prevented from deteriorating significantly and can be improved greatly.

Furthermore, when information relating to the information source 100 with low visibility is superimposed on taken images and displayed so as to be less prominent, the information can be superimposed, in accordance with how the information source 100 appears on the taken images, in an appropriate display style for the information. Accordingly, balanced images with little discomfort can be provided.

[First Modification]

In a first modification, when there are some light sources which are intermittently hidden among a plurality of light source which transmit the same information, it is determined that the visibility is low and information is superimposed on images so as to be less prominent.

Figure 12:
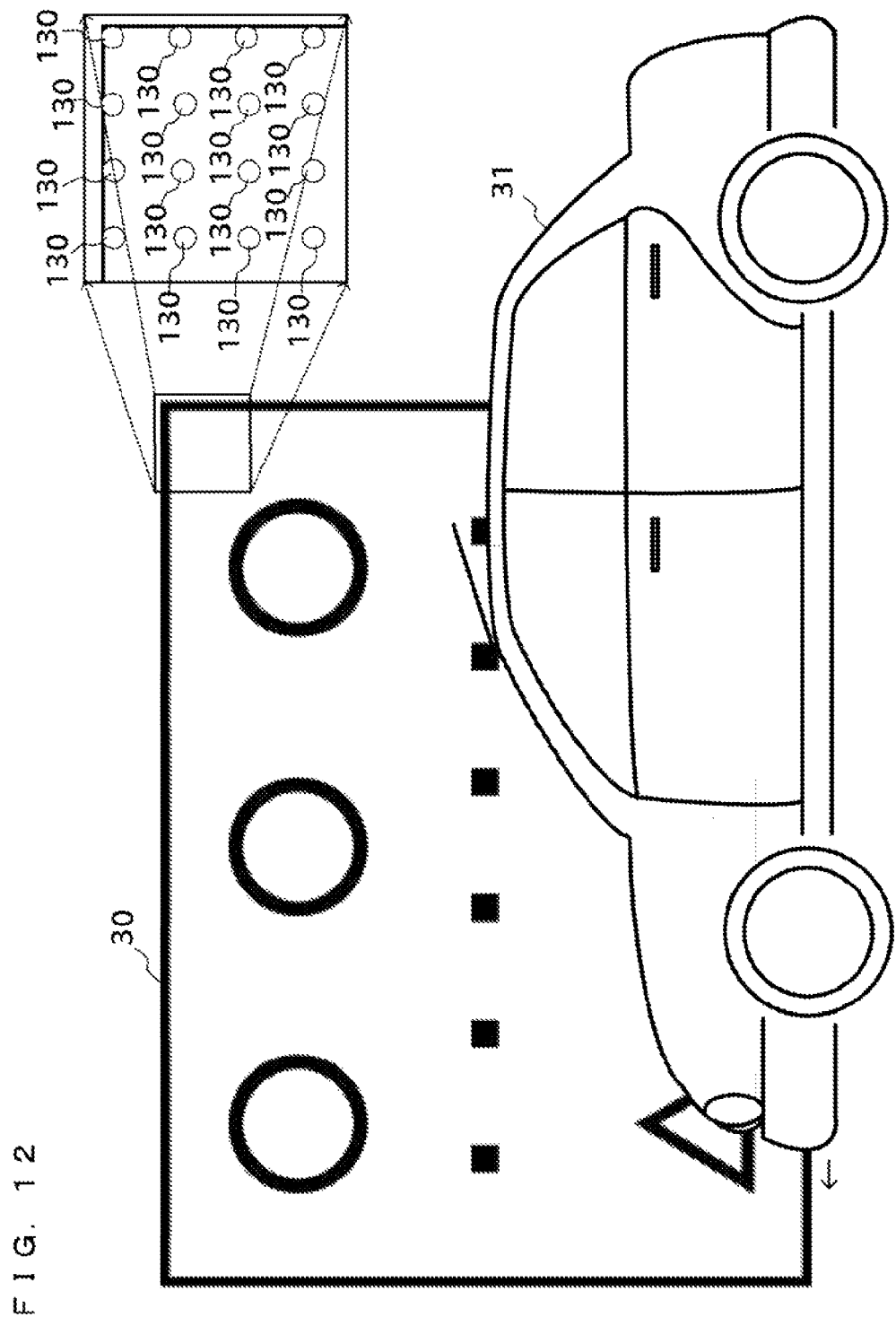
FIG. 12 illustrates an advertising board 30 having a plurality of light sources each of which transmits the same information installed therein and an automobile 31 passing by the advertising board.

FIG. 12 illustrates an advertising board 30 having a plurality of light sources each of which transmits the same information installed therein and an automobile 31 passing by the advertising board.

In the advertising board 30 shown in FIG. 12, information transmission light sources 130 are provided evenly at predetermined intervals, that is, in a matrix state throughout the advertising board 30 and a lower half of the information transmission light sources 130 is intermittently hidden by automobiles that continuously pass by.

From the standpoint of an operator, the advertising board 30 described above can be regarded as having a low visibility when compared with an advertising board in full view.

However, about an upper half of the information transmission light sources 130 is not intermittently hidden and, unless a measure is taken, may be displayed in a manner the same as an advertising board in full view having a high visibility, which is not preferable.

Here, the temporal priorities are grouped into three; however, the number of groups may be two or more. For example, groups of temporal priorities can be increased by, for example, setting the respective thresholds in a stepwise fashion in step S42 and step S43 and defining conditions precisely.

<Configuration>

Figure 13:
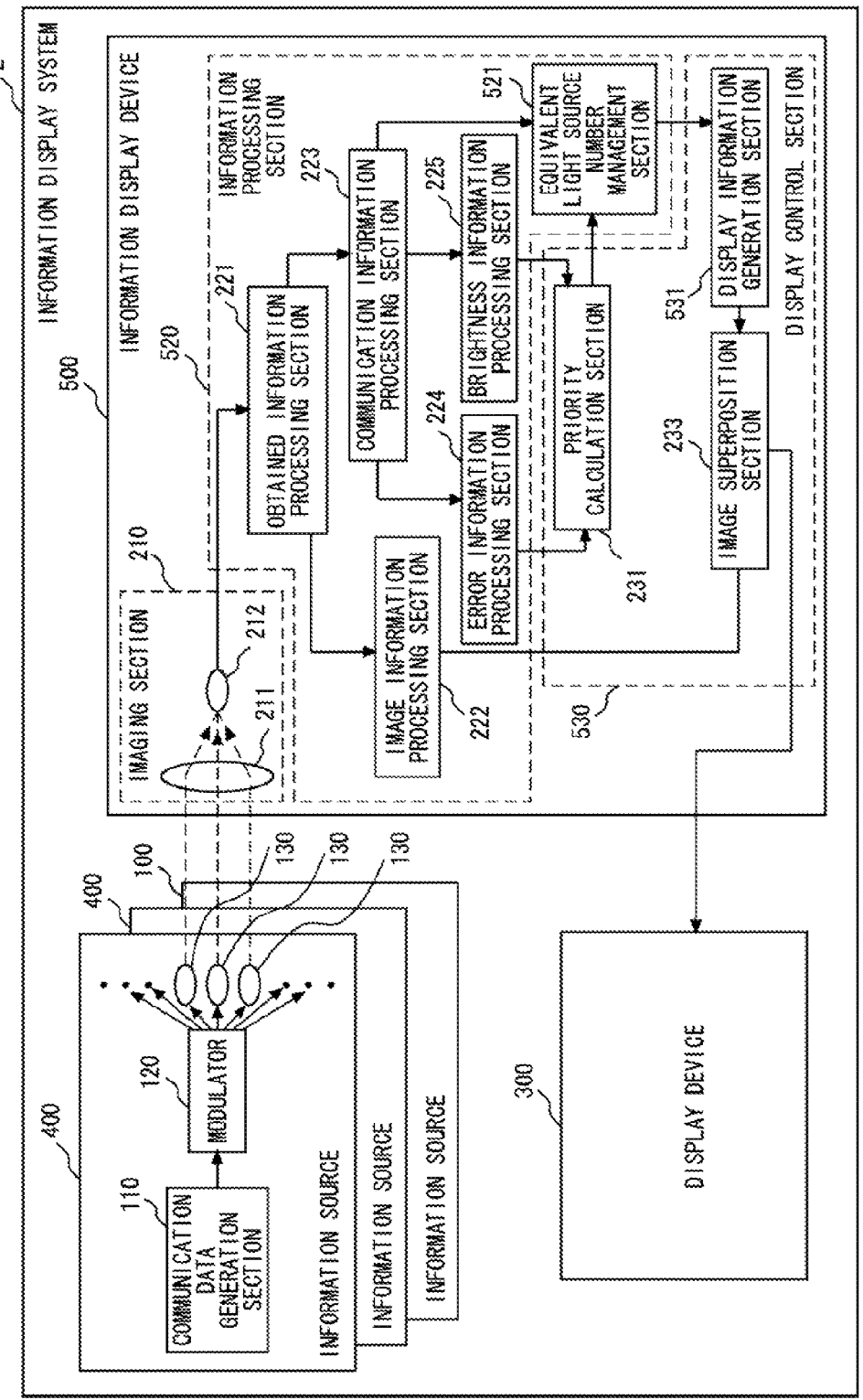
FIG. 13 illustrates an outline of a functional configuration of an information display system 2 of a first modification according to the present invention.

FIG. 13 illustrates an outline of a functional configuration of an information display system 2 of the first modification according to the present invention.

The information display system 2 shown in FIG. 13 includes an information source 400, an information display device 500, and the display device 300. Here, the information display system 2 may include the information source 100.

It should be noted that components the same as those of the information display system 1 in FIG. 1 are denoted by the same numerals and descriptions thereof are omitted.

In the same manner as the advertising board 30 shown in FIG. 13, the information source 400 includes a plurality of light sources each of which transmits the same information, and includes a plurality of information transmission light sources 130 in FIG. 1.

The information display device 500 is different from the information display device 200 in FIG. 1 in that an information processing section 520 and a display control section 530 are included instead of the information processing section 220 and the display control section 230, and includes the information processing section 220 additionally provided with a equivalent light source number management section 521. The display control section 530 is different from the display control section 230 in that a display information generation section 531 is included instead of the display information generation section 232, and includes other components the same as those of the information display device 200.

Based on the communication information generated by the communication information processing section 223 for each light source region, the equivalent light source number management section 521 compares the communication information between the respective light source regions and when it is recognized that there are a plurality of light sources that output the same information within images taken by the imaging section 210, registers the plurality of light sources as a light source group. Specifically, the equivalent light source number management section 521 compares preamble data contained in the communication information generated by the communication information processing section 223 for each light source region with preamble data contained in the communication information for another light source region. When these preamble data coincide with each other, the equivalent light source number management section 521 determines that the light sources output the same information.

Furthermore, among the priorities of the respective light source regions calculated by the priority calculation section 231 based on the stability information, the equivalent light source number management section 521 comprehensively evaluates the priorities of the respective light source regions registered as the light source group and calculates a priority of the light source group. Specifically, when communication information is extracted, for example, based on a number of light sources from which the communication information has been failed to be extracted, the equivalent light source number management section 521 calculates an error rate of the light source group, determines whether the error rate is greater than a defined value, determines, when the error rate is greater than the defined value, that the light source group is in an unstable communication state, and assigns a lower priority to the light source group than when it determines that the light source group is in a stable communication state. It should be noted that, the priority of the light source group can be calculated by, for example, averaging the priorities, adopting a maximum, adopting a minimum, and the like of the plurality of light source regions registered as the light source group.

Based on the information for display contained in the communication information of each light source region generated by the communication information processing section 223, the display information generation section 531 determines information for superimposition and a display mode of the information in accordance with the priority of each light source region calculated by the priority calculation section 231 based on the stability information and the priority of each light source group calculated by the equivalent light source number management section 521, and outputs the information and the display mode to the image superposition section 233.

Furthermore, based only on a position of a light source, among the light source group, with respect to which a failure rate of extracting communication information is lower than a defined value, the display information generation section 531 determines a position in images taken by the imaging section 210 at which the information for display is superimposed.

Accordingly, by superimposing the information for display at a part not intermittently hidden, that is, having a high visibility, visibility from a user can be improved.

<Summary>

According to the information display system 2 of the first modification, a plurality of light sources that transmit the same information are sorted as a light source group, and priorities calculated for respective light sources are evaluated comprehensively, and thereby realizing a manner of display appropriate for the visibility of an advertising board having the plurality of light sources.

Second Embodiment

<Outline>

The second embodiment is, in the same manner as the first embodiment, applied to a system which transmits information by means of optical space transmission, superimposes information on taken images, and displays the information. According to the present embodiment, a manner of superimposing the information is changed in accordance with the degree of stability of a communication state of each light source. Specifically, information from a light source in an unstable communication state is stored and thereby the information is continuously displayed. Alternatively, information from a light source in an unstable communication state is discarded and thereby readability is improved.

<Configuration>

Figure 14:
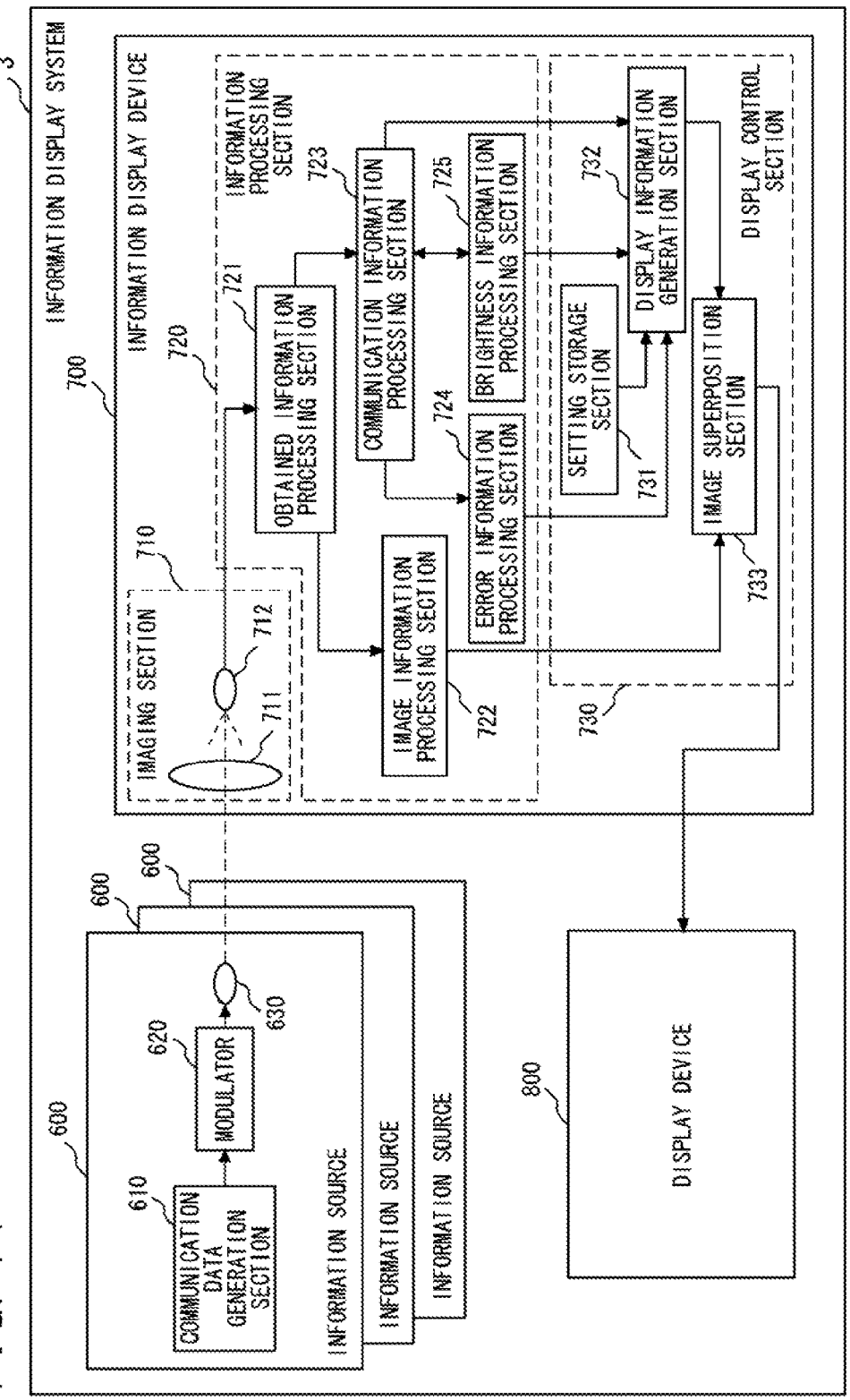
FIG. 14 illustrates an outline of a functional configuration of an information display system 3 of a second embodiment according to the present invention.

FIG. 14 illustrates an outline of a functional configuration of an information display system 3 of the second embodiment according to the present invention.

The information display system 3 shown in FIG. 14 includes an information source 600, an information display device 700, and a display device 800.

The information source 600 is, in the same manner as the information source 100 of the information display system 1 in FIG. 1, a stationary electronic equipment provided together with store shelves for commercial products lined at a store front or an advertising board on the street, having a function of transmitting information for display. The information source 600 includes a communication data generation section 610, a modulator 620, and an information transmission light sources 630.

The information display device 700 is, for example, in the same manner as the information display device 200 of the information display system 1 in FIG. 1, a portable electronic equipment having an imaging function such as a digital camera, a mobile phone with camera, and the like, having a function of: obtaining information for display via an optical wireless communication; superimposing the information for display on a taken video image; and displaying the information. The information display device 700 includes an imaging section 710, an information processing section 720, and a display control section 730.

The display device 800 is, in the same manner as the display device 300 of the information display system 1 in FIG. 1, an image display device such as an LCD monitor.

The communication data generation section 610 generates information for display to be displayed on the information display device 700.

The modulator 620 converts the information for display generated by the communication data generation section 610 into an electric signal.

The information transmission light sources 630 are each a device which is capable of emitting light of a comparatively high intensity of a certain degree or more such as an LED, a fluorescent light, or the like, and which transmits, by using the electric signal converted by the modulator 620, communication information including the information for display to the information display device 700 based on the intensity of light.

FIG. 15 illustrates an example of data format of the communication information transmitted from the information source 600 to the information display device 700 based on the intensity of light. In FIG. 15, "→" represents a travelling direction of a time T.

As shown in FIG. 15, the data format of the communication information includes a preamble data part D30 (described as "PREAMBLE" in FIG. 15, 6 bits in this example), a frame type part D40 (described as "F-TYPE" in FIG. 15, 8 bits in this example), a payload part D50 ("PAYLOAD" in FIG. 15, 512 bits in this example), and a data for check part D60 (described as "CRC" in FIG. 15, 16 bits in this example). A group of some of such communication frames are outputted repeatedly in rotation from the information source 600.

Data stored in the preamble data part D30 includes a preamble pattern which is fixed data used for the information display device 700 to recognize that the data is communication information containing information for display.

Data stored in the frame type part D40 is identification information indicating a type of information stored in the payload part D50, and is, for example, information indicating whether the information is character information, image information, or the like. Alternatively, the data is information indicating a compression format, a type of encoding, and the like, and thereby an application software for properly reproducing data stored in the payload part D50 can be specified.

The data format of the payload part D50 includes a flag section D51 described as "FLAG" in FIG. 15, 8 bits in this example), a length part D52 (described as "ML" in FIG. 15, 16 bits in this example), a message type part D53 (described as "M-TYPE" in FIG. 15, 8 bits in this example), a message part D54 (described as "MESSAGE", a variable length in this example), and a data for check part D55 (described as "CRC" in FIG. 15, 16 bits in this example).

Data stored in the flag section D51 indicates whether the data is the head of a message when information is transmitted by a plurality of communication frames.

Data stored in the length part D52 indicates a total length of the message type part D53 and the message part D54.

Data stored in the message type part D53 is information indicating a type of information to be stored in the message part D54.

Data stored in the message part D54 itself is communication information to be transmitted/received, which is divided into a plurality of parts according to a data length, grouped into a plurality of successive communication frames, and transmitted.

The received plurality of successive communication frames can be reconstructed into a communication message by connecting the data stored in the message part D54 in order of reception starting with the head based on the data stored in the flag section D51.

Data stored in the data for check part D55 is data provided for checking that the data stored in the message type part D53 and the data stored in the message part D54 are transmitted/received successfully.

Data stored in the data for check part D60 is data provided for checking that the data stored in the payload part D50 is transmitted/received successfully.

The imaging section 710 time-sequentially takes images, and includes: a lens 711 for adjusting an image formation state of an incident light; and an image sensor 712 for converting an intensity of light obtained through the lens 711 to an electric signal to generate photoelectric conversion information and taking images by sequentially outputting the photoelectric conversion information to the information processing section 720.

The information processing section 720 specifies, from among the images taken by the imaging section 710, all of light source regions whose brightness changes in a predetermined pattern with time, and from each of the specified one or more light source regions, extracts communication information based on the change in brightness of the light source region, and generates stability information representing a communication state (in case of the second embodiment, an average number of errors, an average number of times of status change, an average brightness, and the like). The information processing section 720 includes an obtained information processing section 721, an image information processing section 722, a communication information processing section 723, an error information processing section 724, and a brightness information processing section 725. Here, the average number of errors represents a number of times communication errors occur and communication information fails to be extracted during the most recent predetermined interval. The average number of times of status change represents a number of times a state in which communication information can be extracted has switched to/from a state in which the communication information cannot be extracted during the most recent predetermined interval. It should be noted that an error rate may be used instead of an average number of errors.

The display control section 730 superimposes the information for display contained in the communication information of each region extracted by the information processing section 720 on the images taken by the imaging section 710, in a manner based on the corresponding stability information generated by the information processing section 720, adjusts the brightness and size of the information for display, and displays the information for display on the external display device 800. The display control section 730 includes a setting storage section 731, a display information generation section 732, and an image superposition section 733.

The obtained information processing section 721 extracts image information to be used for image analysis based on the photoelectric conversion information generated by the image sensor 712 of the imaging section 710, and outputs the image information to the image information processing section 722. The obtained information processing section 721 further specifies the light sources which are the information source, and sets a light source region for each light source. Then, the obtained information processing section 721 extracts brightness information representing temporal change in brightness of each light source region having been set, and outputs, in association with the extracted brightness information, the region information representing the set light source region to the communication information processing section 723.

The image information processing section 722 performs an image information process of converting a color space, adjusting a viewing angle, and the like, required for outputting images on a screen, on the image information extracted by the obtained information processing section 721 so as to adjust the image information for display, and outputs the adjusted image information to the image superposition section 733.

The communication information processing section 723, with respect to each light source region represented by the region information extracted by the obtained information processing section 721, recognizes the temporal change in brightness represented by the brightness information extracted by the obtained information processing section 721 as either a bit "0" or a bit "1," thereby generates communication information, and outputs the communication information together with the region information to the display information generation section 732.

Here, the communication information processing section 723 stores a bit string for determining whether change in brightness of each light source region in taken images is of visible light communication.

For example, in images time-sequentially taken by the imaging section 710, there are three regions in which brightness changes as indicated below.

(region 1) 01010011100000000010 . . .
(region 2) 10110110111000000000 . . .
(region 3) 11101111101111001000 . . .

In the above example, when a bit string, "111000000000" for determination is prestored in the communication information processing section 723, a determination result by the communication information processing section 723 is as follows.

(region 1) 7th to 18th bits coincide with the bit string for determination, and thus the communication information processing section 723 determines that the light source is a light source of visible light communication.

(region 2) 9th to 20th bits coincide with the bit string for determination, and thus the communication information processing section 723 determines that the light source is a light source of visible light communication.

(region 3) There is no bit that coincides with the bit string for determination, and thus the communication information processing section 723 determines that the light source is not a light source of visible light communication and repeats determination until there is any bit that coincides with the bit string for determination is found.

Further, the communication information processing section 723: manages, with respect to each light source region, communication history information containing times at which communication has shifted to a stable condition and times at which communication has shifted to an unsuccessful condition; calculates, with respect to each light source region, an average number of errors and an average number of times of status change by using the communication history information being managed at a time of generating communication information; outputs the average number of errors and the average number of times of status change together with the region information to the error information processing section 724; and outputs the brightness information together with the region information to the brightness information processing section 725.

Based on the average number of errors and the average number of times of status change of each light source region calculated by the communication information processing section 723, the error information processing section 724 determines whether the communication state is stable and outputs a determination result to the display information generation section 732. Specifically, for example, when both of conditions that the average number of errors is greater than or equal to a defined number N and that the average number of times of status change is greater than or equal to a defined number M are satisfied, the error information processing section 724 determines that the communication state is unstable. Meanwhile, when either condition is not satisfied, the error information processing section 724 determines that the communication state is stable. Alternatively, for example, the error information processing section 724 may determine that the communication state is unstable when both of conditions that an error rate (a number of communication errors/processing frequency) is greater than or equal to a defined value L and that the average number of times of status change is greater than or equal to the defined number M are satisfied.

Based on the brightness information of each light source region extracted by the obtained information processing section 721, the brightness information processing section 725 calculates an average of the brightness represented by the brightness information of each light source region, and excludes a light source region with an average brightness less than a lower limit of a defined signal amplitude from processing targets. It should be noted that a method of calculating an average of the brightness represented by the brightness information is the same as that in the first embodiment.

The setting storage section 731 receives a user's display setting indicating as to whether the information for display contained in the communication information corresponding to the region in an unstable communication state should be displayed on the display device 800, and stores the display setting.

Further, the setting storage section 731 receives a user's display attribute setting for a region in an unstable communication state separately from a display attribute setting for a region in a stable communication state, and stored the display setting. Specifically, the display attributes of the region in an unstable communication state are a font, size, a character color, a character format (underline, bold, italics, and the like), a display background (shape, and the like of speech bubble), a background color, transparency, and the like. Setting values different from the display attributes of the region in a stable communication state are used and thereby the region in an unstable communication state can be intuitively recognized by the user's vision. For example, an occupation area for superimposing information for display on images in case of the region in an unstable communication state is substantially reduced so as to be smaller than that in case of the region in a stable communication state. Here, the occupation area can be substantially reduced specifically by one of or combination of reducing an amount of information, reducing a character to be displayed in size; reducing a mark to be displayed in size, reducing a speech bubble to be displayed in size, changing the order of superimposing the speech bubble so as to be a lower level, increasing the transmissivity, and the like. Furthermore, when reducing the occupation area, it is more effective if a color of the character to be displayed, a color of the mark to be displayed, a color of the speech bubble to be displayed, or the like is changed to a comparatively less prominent color, a quiet color, a color close to a background color, or the like.

It should be noted that the display attribute setting is not necessarily required and no display attribute setting may be performed. Furthermore, the display attributes of the region in an unstable communication state may be the same as the display attributes of the region in a stable communication state.

Based on the information for display contained in the communication information of each light source region generated by the communication information processing section 723, the display information generation section 732 determines the information for superimposition and a display mode of the information in a manner in accordance with the display setting and the display attribute setting stored in the setting storage section 731, and outputs the information for superimposition and the display mode to the image superposition section 733.

The image superposition section 733 superimposes the information for superimposition determined by the display information generation section 732, in the determined display mode, on the image information on which the image information process has been performed by the image information processing section 722, and outputs the superimposed information to the display device 800 and displays images.

The image superposition section 733 may superimpose the information for display of each light source region at a position in accordance with a position of the light source region. More specifically, for example, the information for display may be superimposed at the corresponding position of the light source region, may be connected with the corresponding position of the light source region with an arrow, or the like, or may be described in a speech bubble popping up from the position of the light source region.

Specifically, based on the stability information, the display information generation section 732 superimposes the information for display contained in the communication information with respect to which the communication state has been determined to be stable on images taken by the imaging section 710 and displays the information for display on the display device 800. Further, when the display setting stored in the setting storage section 731 indicates that the communication information should not be displayed, based on the stability information, the display information generation section 732 discards the communication information with respect to which the communication state has been determined to be unstable. Further, when the display setting stored in the setting storage section 731 indicates that the communication information should be displayed, based on the stability information, the display information generation section 732 stores the information for display contained in the communication information with respect to which the communication state has been determined to be unstable, superimposes the stored information for display on the images taken by the imaging section 710 and displays the information for display on the display device 800 continuously while the communication state is determined to be unstable.

It should be noted that the information for display contained in the communication information corresponding to the region in an unstable communication state always may be displayed on the display device 800, or always may not be displayed on the display device 800, without setting the display setting.

<Operation>

FIG. 16 illustrates a series of procedure from a light source region detection process through to a signal verification process and a superimposition process in the second embodiment.

Steps S51 to S57 are process steps of the light source region detection process.

(1) The obtained information processing section 721 buffers images taken by the image sensor 712 as a plurality of frame data corresponding to the number of bits of the preamble data part D10 (step S51).

(2) With respect to the plurality of frame data buffered in step S51, it is determined whether there is any light source whose brightness changes (step S52).

(3) When it is determined that there is a light source whose brightness changes (step S52: YES), the obtained information processing section 721 compares the buffered frame data with the preamble pattern in the preamble data part D30 to determine whether these coincide with each other (step S53).

(4) When it is determined that there is no light source whose brightness changes (step S52: NO), and when there is no light source whose frame data coincides with the preamble pattern (step S53: NO), the obtained information processing section 721 determines that all of the light sources whose brightness changes are not communication information, then the process proceeds to a process (step S65) with respect to a blinking light source in a communication state with low stability (step S54).

(5) When it is determined that there is a light source whose buffered frame data coincides with the preamble pattern (step S53: YES), the obtained information processing section 721 specifies the light source whose brightness changes and whose buffered frame data has been determined to coincide with the preamble pattern as the light source which transmits the communication information containing data for display, and extracts image information to be used for image analysis. Further, the image information processing section 722 adjusts the extracted image information for display (step S55).

(6) The obtained information processing section 721 obtains an imaging direction and an imaging angle by using a gyroscope, a direction magnet, or the like (step S56).

(7) The imaging direction and the imaging angle obtained in step S56 are stored together with the region information representing the light source region including the light source whose brightness changes (step S57).

Steps S58 to S64 are process steps of the signal verification process.

(8) The communication information processing section 723 receives communication information in a data format as shown in FIG. 15 from the light source region represented by the region information stored in step S57, and buffers a bit string corresponding to the number of bits of a single communication frame for each light source region. Further, based on the brightness information of each light source region extracted by the obtained information processing section 721, the brightness information processing section 725 calculates an average of the brightness represented by the brightness information per communication frame for each light source region. Here, a light source region whose average brightness is less than the lower limit of the defined signal amplitude is excluded from processing targets (step S58).

(9) It is determined whether there is any light source region that remains without being excluding from the processing targets (step S59). When all of the light source regions have been excluded from the processing targets (step S59: NO), the process proceeds to the process with respect to a blinking light source (step S65).

(10) When there is at least one light source region that remains without being excluded from the processing targets (step S59: YES), with respect to each of the remaining light source regions, the first CRC check is performed on the bit string corresponding to the number of bits of a single communication frame. Then, a time at which an unsatisfactory result of the CRC check is obtained is added to the communication history information of each of the respective light source regions (step S60).

(11) It is determined whether there is any light source region with respect to which a result of the first CRC check is satisfactory (step S61). When results of the first CRC check with respect to all of the light source region are unsatisfactory (abnormal) (step S61: NO), the process proceeds to the process (step S65) with respect to a blinking light source.

(12) When there is at least one light source region with respect to which a result of the first CRC check is satisfactory (normal) (step S61: YES), data of a single communication message stored in the payload part D50 is buffered with reference to the flag section D51 and the length part D52 for each of the remaining light source regions (step S62).

(13) With respect to the data of a single communication message stored in the payload part D50 of each of the remaining light source regions, the second CRC check is performed. Then, a time at which an unsatisfactory (abnormal) result of the second CRC check is obtained and a time at which a satisfactory result is obtained are added to the communication history information of each of the respective light source regions (step S63).

(14) It is determined whether there is any light source region with respect to which a result of the second CRC check is satisfactory (step S64). When there is any light source region with respect to which a result of the second CRC check is satisfactory (step S64: YES), the process proceeds to step S66.

Steps S65 to S71 are process steps of the superimposition process.

(15) When all of the light source regions have been excluded from the processing targets (step S59: NO), when all of the results of the first CRC check with respect to all of the light source regions are unsatisfactory (step S61: NO), and when all of the results of the second CRC check with respect to all of the light source regions are unsatisfactory (step S64: NO), it is determined whether there is any blinking light source (step S65). Here, details of a method of determining a blinking light source is as follows. First, by using the communication history information, a number of times (average number of errors) communication errors occurred and communication information cannot be extracted during the most recent predetermined time period (e.g. one minute) and a number of times (average number of times of status change) communication has shifted between a stable condition and an unstable condition during the most recent predetermined time period (e.g. five minutes) are calculated. Subsequently, for example, when the calculated average number of errors is greater than or equal to a defined number (e.g. 10 times) and the calculated average number of times of status change is greater than or equal to a predetermined number (e.g. 6 times), it is determined that the corresponding light source is a blinking light source. When one of the average number of errors and the average number of times of status change is less than the defined number, it is determined that the corresponding light source is not a blinking light source. Alternatively, for example, when an error rate (a number of communication errors/processing frequency) during the most recent predetermined time period (e.g. five minutes) is greater than or equal to a defined value (e.g. 30%) and the average number of times of status change is greater than or equal to a predetermined number (e.g. 6 times), it can be determined that the corresponding light source is a blinking light source. It should be noted that some of conditions of determining a blinking light source may be used in combination.

(16) When there is any light source region with respect to which a result of the CRC check is satisfactory (step S64: YES), it is determined whether there is any blinking light source in a communication state with low stability (step S66).

(17) When it is determined that there is no blinking light source (step S66: NO), information for display of the light source region with respect to which a result of the CRC check is satisfactory is superimposed on the image information in a display mode in accordance with the display attributes set for display (step S67).

(18) When it is determined that there is any blinking light source (step S66: YES), information for display of a light source region with respect to which a result of the CRC check is satisfactory and which is not a blinking light source is superimposed on the image information in a display mode in accordance with the display attributes set for display. Meanwhile, information for display of a light source region with respect to which a result of the CRC check is satisfactory and which is a blinking light source is stored (step S68).

(19) When it is determined that there is any blinking light source (subsequent to step S68, step S65: NO), it is determined whether the display setting stored in the setting storage section 731 is set to "display" or "non display" (step S69). When the display setting is set to "non display," the process proceeds to an image display process (step S71).

(20) When the display setting is set to "display" (step S69: YES), information for display of the light source region which is a blinking light source stored in the image information is superimposed in a display mode in accordance with the display attributes set for a blinking light source (step S70).

(21) When it is determined that there is no blinking light source (step S65: NO) and when the superimposition process for each of the corresponding light source regions (subsequent to step S67, subsequent to step S70, respectively) is completed, the image information on which the information for display is superimposed is outputted to the display device 800 and images are displayed, and all of the buffered data is discarded. Then, the process returns to buffering (step S51) frame data (step S71).

<Summary>

According to the information display system 3 of the second embodiment, when information is superimposed on taken images and displayed by transmitting the information by means of optical space transmission, the visibility of the information source 600 when seen from an operator operating the information display device 700 is considered. When a reception condition of transmission from any information source among information sources is unstable in such a case where the information source 600 is momentarily interrupted by a passer-by, and the like, information for display corresponding to a region in an unstable reception condition is stored, and the stored information for display is continuously displayed on a display device, the information corresponding to the region in an unstable reception condition can be discarded, and the information for display can be prevented from being intermittently hidden, thereby improving readability.

The above embodiment also can be realized by causing a CPU to execute a program which can cause the CPU to execute the procedures stored in a storage device (a ROM, a RAM, a hard disk or the like). In this case, the program may be stored in the storage device via a recording medium and executed, or may be executed directly from the recording medium. The recording medium herein may be a semiconductor memory such as a ROM, a RAM, or a flash memory; a magnetic disk memory such as a flexible disk or a hard disk; an optical disk such as a CD-ROM, a DVD, or a BD; or a recording medium such as a memory card. The recording medium includes a communication medium such as a phone line or a carrier channel.

Each of respective functional blocks of the information processing section 220 and the display control section 230, respective functional blocks of the information processing section 520 and the display control section 530, respective functional block of the information processing section 720 and the display control section 730 is realized as an integrated circuit such as an LSI. These functional blocks may be individually formed on a chip, or some or all of the functional blocks may be integrated on a chip. These LSI chips may be referred to as ICs, system LSIs, super LSIs, or ultra LSIs depending on the degree of integration.

Further, the method of circuit-integration is not limited to the LSI, and the circuit-integration may be realized using dedicated circuits or general purpose processors. For example, an FPGA (Field Programmable Gate Array), which is programmable after manufacturer of the LSI; or a reconfigurable processor, which can configure setting and connection of circuit cells inside the LSI, may be used.

If a new technology replacing the LSI arises as a result of an improvement of the semiconductor technology or another technology derived therefrom, naturally, the function blocks may be integrated using such a technology. Adoption of biotechnology or the like may be one possibility.

The communication system incorporating the present invention takes the form of an adaptor, which converts a signal interface such as an Ethernet (registered trademark) interface, IEEE 1394 interface, or USB interface into an interface for a power line communication, thereby connecting with a multimedia apparatus such as a personal computer, a DVD recorder, a digital television, and a home server system, which includes various interfaces. Accordingly, it is possible to build a network system capable of high-speed transmission of digital data such as multimedia data via a power line. Unlike a conventional wired LAN, there is no need to newly lay a network cable because the existing power lines in homes, offices, or the like may be used as a network line, which realizes a lower cost and ease of installation. Thus this communication system is highly convenient.

In the future, incorporation of the present invention into a multimedia apparatus such as a personal computer, a DVD recorder, a digital television, and a home server system, enables data transmission between multimedia apparatuses via power cords thereof. In such a case, wiring is simplified because there is no need for an adaptor, Ethernet cable, IEEE 1394 cable, and USB cable. The multimedia apparatus can be connected to the Internet via a router, and connected to a wireless LAN or conventional wired LAN via a hub or the like. Thus there is no problem in extending the present invention.

Unlike a wireless LAN, the power line transmission system transmits communication data via the power line, causing no problem of data leakage due to interception of a radio wave. Therefore, the power line transmission system is effective for data protection in terms of security. It is understood that data transmitted via the power line are protected by, for example, IPsec in IP protocol, encrypted contents, or other DRM (Digital Rights Management) systems.

As described above, it is possible to transmit high-quality AV contents using the power line by implementing a QoS (Quality of Service) function including a copyright protection function such as encrypting contents, or the effects of the present invention (throughput enhancement, band allocation flexibly responding to increase in retransmission and traffic change).

While the present invention has been described in detail, the foregoing description is in all aspects illustrative and not restrictive. It is understood that numerous other modifications and variations are possible within the scope of the present invention.

The information display device, the integrated circuit for display control, the display control program, and the display control method according to the present invention are applicable to a digital camera, a mobile phone, a note PC, and the like having a function of displaying taken images, and are greatly useful because readability can be improved when information is extracted from taken images and superimposed on the images.

DESCRIPTION OF THE REFERENCE CHARACTERS 1 information display system
2 information display system
3 information display system
100 information source
110 communication data generation section
120 modulator
130 information transmission light source
200 information display device
210 imaging section
211 lens
212 image sensor
220 information processing section
221 obtained information processing section
222 image information processing section
223 communication information processing section
224 error information processing section
225 brightness information processing section
230 display control section
231 priority calculation section
232 display information generation section
233 image superposition section
300 display device
400 information source
500 information display device
520 information processing section
521 equivalent light source number management section
530 display control section
531 display information generation section
600 information source
610 communication data generation section
620 modulator
630 information transmission light source
700 information display device
710 imaging section
711 lens
712 image sensor
720 information processing section
721 obtained information processing section
722 image information processing section
723 communication information processing section
724 error information processing section
725 brightness information processing section
730 display control section
731 setting storage section
732 display information generation section
733 image superposition section
800 display device

The invention claimed is:
1. An information display device, comprising:
an imaging section configured to time-sequentially take images of an object;
an obtained information processing section configured to obtain information for display which is transmitted, by optical space transmission, from a light source contained in the object whose images have been taken;
a communication information processing section configured to restore the information for display;
a calculation section configured to calculate a value representing a degree of stability of communication by the optical space transmission, which communication is performed in obtaining the information for display;
an information generation section configured to select superimposition information from among the informa- tion for display in accordance with the value representing the degree of stability; and an image superimposition section configured to superimpose the superimposition information on the taken images of the object and display the superimposition information superimposed on the images on a display device, wherein the information generation section selects a larger amount of information as the superimposition information from among the information for display when a state of the communication is determined to be stable based on the value representing the degree of stability than when the state of the communication is determined to be unstable based on the value representing the degree of stability.

2. The information display device according to claim 1, wherein the communication information processing section does not restore the information for display when brightness of the light source is smaller than or equal to a predetermined value.

3. The information display device according to claim 2, further comprises an equivalent light source management section configured to, when a plurality of light sources are included in the object and each of the plurality of light sources transmits information for display equivalent to that from the other light sources, register the plurality of light sources as a single light source group which is used in calculating, by the calculation section, the value representing the degree of stability.

4. The information display device according to claim 3, wherein the equivalent light source management section determines, when only a part of the plurality of light sources is displayed on the display device due to a predetermined passing-by object, the value representing the degree of stability for the light source group based on the value representing the degree of stability of communication using the part of the plurality of light sources which is displayed.

5. The information display device according to claim 1, further comprises an equivalent light source management section configured to, when a plurality of light sources are included in the object and each of the plurality of light sources transmits information for display equivalent to that from the other light sources, register the plurality of light sources as a single light source group which is used in calculating, by the calculation section, the value representing the degree of stability.

6. The information display device according to claim 5, wherein the equivalent light source management section determines, when only a part of the plurality of light sources is displayed on the display device due to a predetermined passing-by object, the value representing the degree of stability for the light source group based on the value representing the degree of stability of communication using the part of the plurality of light sources which is displayed.

7. The information display device according to claim 1, further comprises an equivalent light source management section configured to, when a plurality of light sources are included in the object and each of the plurality of light sources transmits information for display equivalent to that from the other light sources, register the plurality of light sources as a single light source group which is used in calculating, by the calculation section, the value representing the degree of stability.

8. The information display device according to claim 7, wherein the equivalent light source management section determines, when only a part of the plurality of light sources is displayed on the display device due to a predetermined passing-by object, the value representing the degree of stability for the light source group based on the value representing the degree of stability of communication using the part of the plurality of light sources which is displayed.

9. The information display device according to claim 1, further comprises an equivalent light source management section configured to, when a plurality of light sources are included in the object and each of the plurality of light sources transmits information for display equivalent to that from the other light sources, register the plurality of light sources as a single light source group which is used in calculating, by the calculation section, the value representing the degree of stability.

10. The information display device according to claim 9, wherein the equivalent light source management section determines, when only a part of the plurality of light sources is displayed on the display device due to a predetermined passing-by object, the value representing the degree of stability for the light source group based on the value representing the degree of stability of communication using the part of the plurality of light sources which is displayed.

11. The information display device according to claim 1, wherein the calculation section calculates the value representing the degree of stability, by using an average rate of errors which have occurred at a time of restoring the information for display by the communication information processing section.

12. The information display device according to claim 1, wherein the calculation section calculates a lower value as the value representing the degree of stability when the state of the communication by the optical space transmission is determined to be stable than when the state of the communication by the optical space transmission is determined to be not stable, and when the value representing the degree of stability is equal to or lower than a predetermined value, the information generation section determines that the state of the communication is stable; and when the value representing the degree of stability exceeds the predetermined value, the information generation section determines that the state of the communication is not stable.

13. The information display device according to claim 1, wherein the information generation section selects, as the superimposition information, all information included in the information for display when the state of the communication is determined to be stable.

14. An integrated circuit, comprising:

an obtained information processing section configured to obtain information for display which is transmitted, by optical space transmission, from a light source contained in an object whose images have been taken;

a communication information processing section configured to restore the information for display;

a calculation section configured to calculate a value representing a degree of stability of communication by the optical space transmission, which communication is performed in obtaining the information for display;

an information generation section configured to select superimposition information from among the information for display in accordance with the value representing the degree of stability; and an image superimposition section configured to superimpose the superimposition information on the taken images of the object and display the superimposition information superimposed on the images on a display device, wherein the information generation section selects a larger amount of information as the superimposition information from among the information for display when a state of the communication is determined to be stable based on the value representing the degree of stability than when the state of the communication is determined to be unstable based on the value representing the degree of stability.

15. An information display method, comprising:
an imaging step of time-sequentially taking images of an object;
an obtained information processing step of obtaining information for display which is transmitted, by optical space transmission, from a light source contained in the object whose images have been taken;
a communication information processing step of restoring the information for display;
a calculation step of calculating a value representing a degree of stability of communication by the optical space transmission, which communication is performed in obtaining the information for display;
an information generation step of selecting superimposition information from among the information for display in accordance with the value representing the degree of stability; and
an image superimposition step of superimposing the superimposition information on the taken images of the object and displaying the superimposition information superimposed on the images on a display device,
wherein in the information generation step, a larger amount of information is selected as the superimposition information from among the information for display when a state of the communication is determined to be stable based on the value representing the degree of stability than when the state of the communication is determined to be unstable based on the value representing the degree of stability.

* * * * *